Nov. 1, 1938.　　V. R. KIMBALL ET AL　　2,135,375

TELEGRAPH PRINTER

Original Filed March 15, 1934　　5 Sheets-Sheet 1

INVENTORS
V. R. KIMBALL
R. F. DIRKES
E. R. WHEELER
BY Eugene C. Brown
ATTORNEY

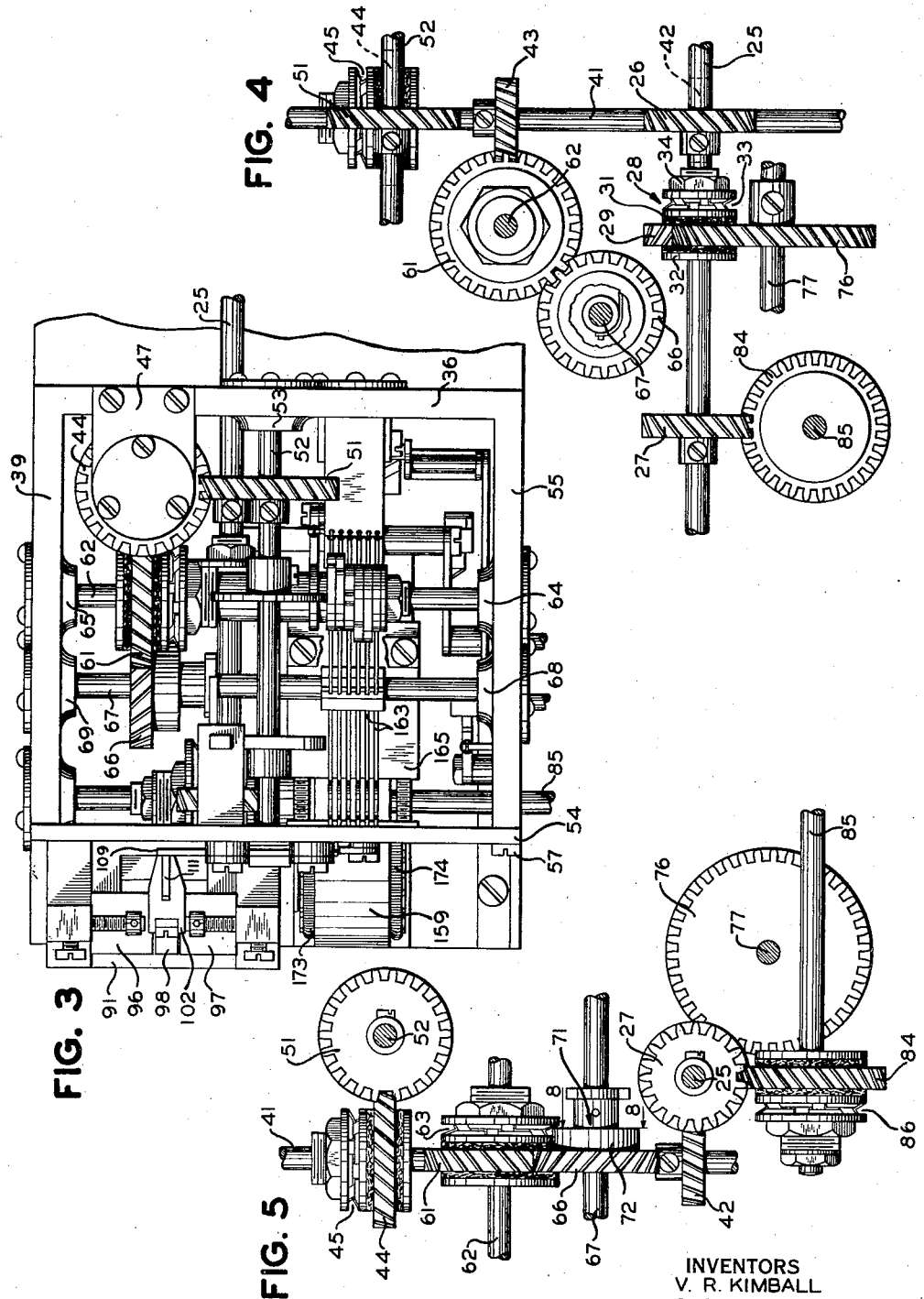

Nov. 1, 1938.　　V. R. KIMBALL ET AL　　2,135,375
TELEGRAPH PRINTER
Original Filed March 15, 1934　　5 Sheets-Sheet 3

INVENTORS
V. R. KIMBALL
R. F. DIRKES
E. R. WHEELER
BY Eugene C. Brown
ATTORNEY

Nov. 1, 1938.   V. R. KIMBALL ET AL   2,135,375
TELEGRAPH PRINTER
Original Filed March 15, 1934   5 Sheets-Sheet 4
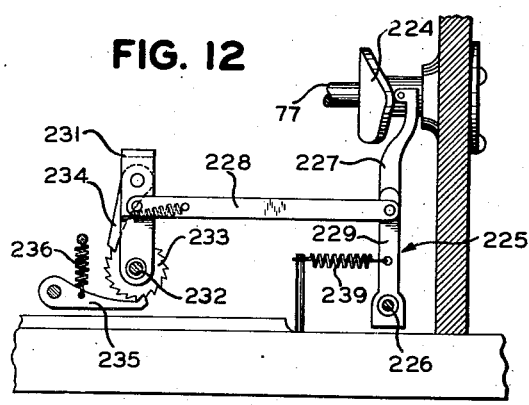
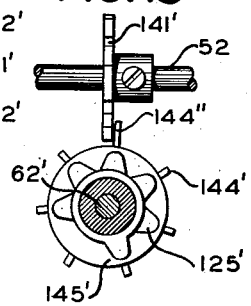
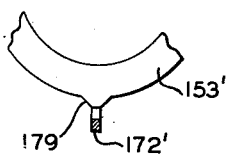
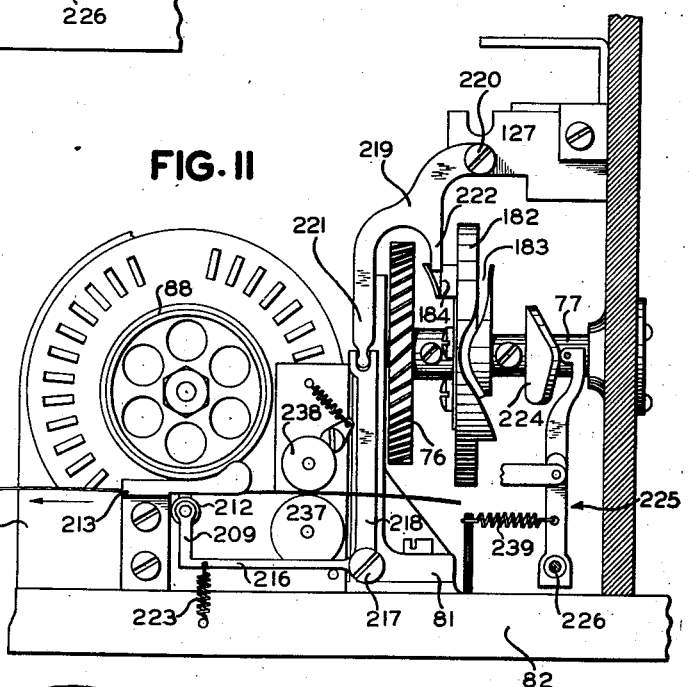
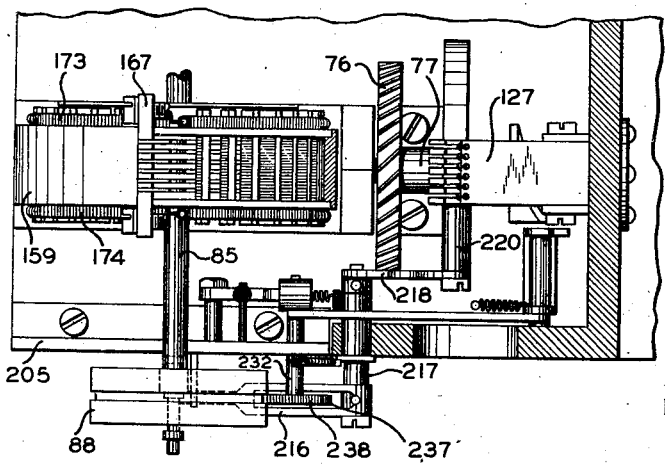
INVENTORS
V. R. KIMBALL
R. F. DIRKES
E. R. WHEELER
BY Eugene C. Brown
ATTORNEY Nov. 1, 1938.  V. R. KIMBALL ET AL  2,135,375
TELEGRAPH PRINTER
Original Filed March 15, 1934   5 Sheets-Sheet 5

INVENTORS
V. R. KIMBALL
R. F. DIRKES
E. R. WHEELER
BY Eugene E. Brown
ATTORNEY

Patented Nov. 1, 1938

2,135,375

UNITED STATES PATENT OFFICE 2,135,375

TELEGRAPH PRINTER

Vernon R. Kimball, Union City, N. J., Robert F. Dirkes, Jamaica, N. Y., and Evan R. Wheeler, Plainfield, N. J., assignors to The Western Union Telegraph Company, New York, N. Y., a corporation of New York Application March 15, 1934, Serial No. 715,752
Renewed August 10, 1938

116 Claims.   (Cl. 178—34)

The present invention relates to selecting and recording mechanisms and is especially suitable for a telegraph printer but the principles thereof may be equally well applied to a receiving perforator, a repeater for telegraph signals and to various other types of selective devices.

The invention is particularly concerned with a printer of the self synchronous type, that is, in which no means external to the printer is employed to maintain the printer in synchronous relation to the incoming signals, such as, for instance, the ordinary multiplex distributor.

More particularly it relates to a selecting and recording mechanism of the single magnet type. Printers of this type, as heretofore developed, have maintained synchronism with the incoming signals, by the use of special synchronizing impulses transmitted in definite relation to the selecting impulses. Ordinarily two such impulses are received, one of which permits the selector to come to rest following each character code group and the other of which restarts it in proper phase relation to the succeeding code group. Each character transmitted requires, therefore, either five or six selecting impulses and two synchronizing impulses, or a total of seven or eight line impulses. The synchronizing impulses consume about thirty percent of the line time for the five unit code and about twenty-five percent of the line time for the six unit code.

One of the objects of the present invention is to produce a selecting mechanism which will respond to permutation code signals and which requires no separate synchronizing impulses to maintain its synchronous relation.

By the elimination of these control impulses, the rate of transmission over the line and consequently the number of characters per unit time received upon the printer may be increased, or for the same printer output the line frequency may be reduced, allowing greater margin on the printer and enabling satisfactory operation under more adverse line conditions.

In printers of the start-stop type, the interval occupied by the start and rest impulses is utilized to effect certain transfer operations and to redition the selecting mechanism to respond to the succeeding group of selecting conditions.

Another one of the objects of the present invention is to enable the selecting mechanism to be conditioned to receive a succeeding group of character selecting impulses immediately upon the receipt of the last selecting impulse of the preceding character.

Another object is to produce a selecting mechanism which will respond to groups of selecting impulses received in continuous succession.

In the start-stop type of printer the selection is accomplished through the conjoined action of the line magnet and a rotating distributor shaft which is started and stopped for each character printed. In a printer operating at five hundred characters per minute, this shaft must be started, rotated a full revolution and brought to rest in one five hundredth of a minute. The distributor shaft performs a considerable amount of work and is relatively heavy. When rotating at full speed its momentum is considerable and the incessant and abrupt stopping thereof is objectionable both from the standpoint of wear and noise.

A still further object of the invention is, therefore, to eliminate the frequent starting and stopping of the distributor shaft and to permit the same to rotate continuously, its rate of rotation being modified or checked only when it tends to lose synchronism with the incoming signals.

Another object is to provide a mechanical corrector for the distributor shaft, which is controlled entirely by the character selecting impulses.

Another object is to correct the selector shaft by reversals of the signaling impulses.

Another object is to produce an overlap mechanism which provides nearly a full character overlap for the recording mechanism while permitting the selector elements to respond to successive groups of selecting impulses transmitted with no intervals therebetween.

Since the recording mechanism must complete its cycle in a period of five or six impulses as compared with seven or eight in printers employing start-stop synchronization, it is desirable to increase the time available for positioning the type carrying element relative to the time of reception of a complete character signal and the accomplishment of this purpose constitutes another object of the invention.

Other general objects of the invention are to increase the speed and reliability of the recorder, and to simplify its construction and render it adaptable for either tape or page operation.

Still other objects and advantages of the invention will appear from a detailed description of the accompanying drawings, showing a preferred embodiment thereof, and in which:

Figure 3 is a plan view thereof;

Fig. 4 is a front elevation of the driving mechanism for the various elements of the printer;

Figure 5 is a side elevation of driving mechanism, viewed from the left of Figure 4;

Figure 11 is a front elevation of the press mechanism of the printer;

Figure 12 is a front elevation of the paper feed mechanism;

Figure 13 is an irregular horizontal sectional view of the printer, partially below and partially above section line 7—7 of Figure 1;

Figure 14 is a side elevation of a modified form of control for the selecting shaft, permitting start-stop operation of the printer;

Figure 15 is a front elevation of the selector shaft control mechanism shown in Figure 14;

Figure 16 is a fragmentary view of the shift control mechanism;

Figures 1, 2:
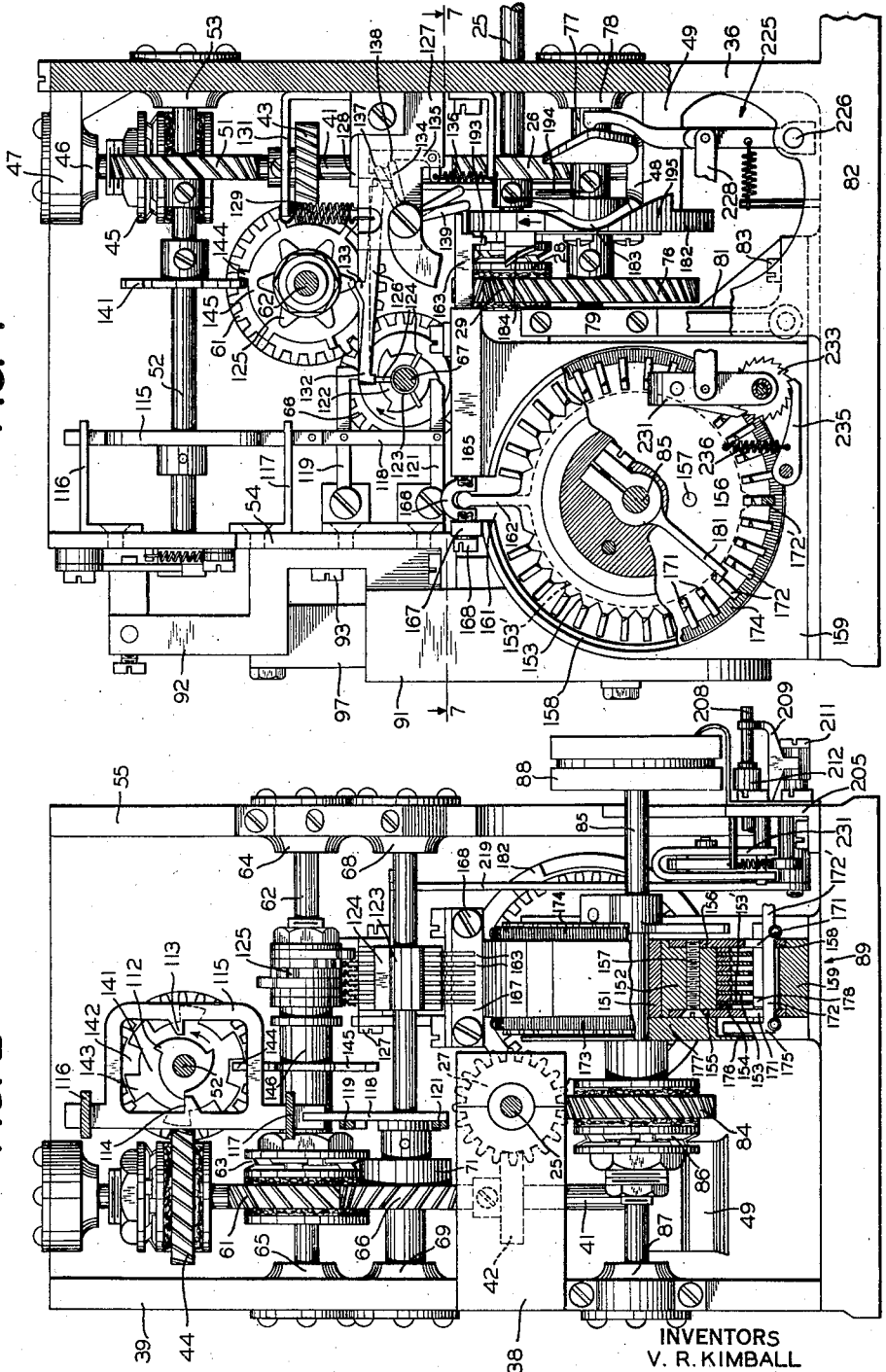
Figure 1 is a front elevation, partly in section, of a printer embodying the present invention.
Figure 2 is a side elevation, partly in section, of the printer.

Referring first to Figures 4 and 5, the operation of the selecting and recording mechanism is effected through seven rotatable shafts, all driven from a common motor, through appropriate gearing and clutch mechanisms. The shaft 25 is driven directly from a motor, not shown, and has rigidly mounted thereon two gears 26 and 27. Loosely mounted on the motor shaft, and driven thereby, through a friction clutch 28 is a third gear 29. The friction clutch is of well known form and therefore is not described in detail. It is sufficient to state that it comprises a pair of clutch faces 31, 32, at either side of the gear 29 and fixed to rotate with the shaft, and cooperating clutch faces fixed to the gear 29. The clutch faces are urged into frictional engagement with each other by a pair of spider springs 33, the tension of which is adjusted by a nut 34.

Figure 7:
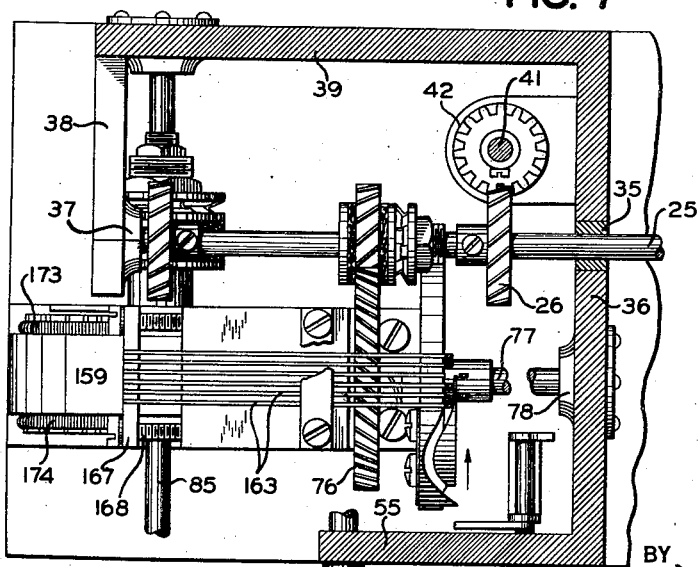
Figure 7 is a horizontal sectional view substantially on the line 7—7 of Figure 1.

The shaft 25 is journaled in a bearing 35 (Figure 7) in the vertical rear wall 36 of the printer and in a bearing 37, carried by plate 38, secured to the vertical left side wall 39 (Figure 2) of the printer.

Driven from the gear 26 is a vertical shaft 41 carrying a gear 42 meshing with the gear 26. The shaft 41 has rigidly mounted thereon a gear 43, and loosely mounted thereon is a gear 44, driven from shaft 41 by a friction clutch 45, similar in construction to clutch 28. The shaft 41 is journaled at its upper end in a bearing cap 46 (Figure 1) carried by a bracket 47, and at its lower end it is journaled in a bearing 48, carried by bracket 49.

The gear 44 meshes with a gear 51 fixed on a horizontal shaft 52, journaled in a bearing 53 in wall 36 of the main casting, and in a bearing, not shown, in the plate 54 (Figure 1) extending across and secured to the vertical side walls 39 and 55 of the casting (Figure 3) by screws 57. The shaft 52 is the escapement shaft and its operation is controlled by the line magnet, as will subsequently appear.

The gear 43 meshes with a gear 61 loose on the selector cam shaft 62, the shaft being driven from the gear 61 through a friction clutch 63 (Figure 5). The shaft 62 is journaled in bearings 64 and 65 (Figure 2) in the front and rear walls 55 and 39, respectively, of the main casting. This shaft is rotated in synchronism with the received line signals and carries the cams for operating the permutation selectors of the printer.

Figure 8:
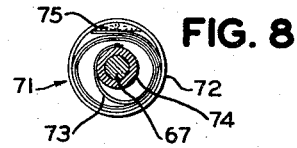
Figure 8 is a sectional view on the line 8—8 of Figure 5, showing one form of clutch mechanism employed in the printer.

Meshing with the gear 61 is a gear 66, loose on the shaft 67. This shaft is controlled from the escapement shaft 52 as will presently appear, and determines the selective action of the selector operating cams, on the permutation selectors. It is journaled in bearings 68 and 69 (Figure 2) in the walls 55 and 39, respectively, of the printer and is driven from gear 66 through a friction clutch 71 of a design somewhat different from the clutches previously referred to. The construction of clutch 71 is shown in Figure 8 and comprises a flange or housing 72 secured to the gear 66, a spiral spring 73 contained within the flange 72 having one end secured to a sleeve 74 fixed on the shaft 67 and the other end secured to a friction shoe 75 pressed by the spring into engagement with the inner wall of the flange 72. The special function of this clutch will be described hereinafter.

Referring again to Figure 4, the gear 29 on motor shaft 25 engages with a gear 76 fixed on the operating cam shaft 77 journaled in a bearing 78 (Figure 1) in wall 36 of the casting, and bearing 79 in the upright bracket 81 secured to the base 82 of the casting as by screws 83. The shaft 77 carries the operating cams for controlling the setting of the type wheel positioning mechanism, the press operation and the tape feed operation.

The gear 27 of motor shaft 25 meshes with a gear 84 loosely mounted on the type wheel shaft 85. The shaft 85 is driven from the gear 84 through a friction clutch 86 similar to clutch 28, previously described. One end of the shaft 85 is journaled in a bearing 87 (Figure 2) in the wall 39 and the other end extends outwardly beyond the frame of the machine and has the type wheel 88 mounted thereon. An intermediate bearing for the shaft 85 is provided in the notched selector disc assembly 89 as will appear hereinafter.

These seven shafts, namely, the motor shaft 25, vertical operating shaft 41, escapement shaft 52, selector cam shaft 62, selector controlling shaft 67, operating cam shaft 77 and type wheel shaft 85, supply power for all operations of the machine, under the control of the single line magnet.

*Selecting mechanism*

Figure 6:
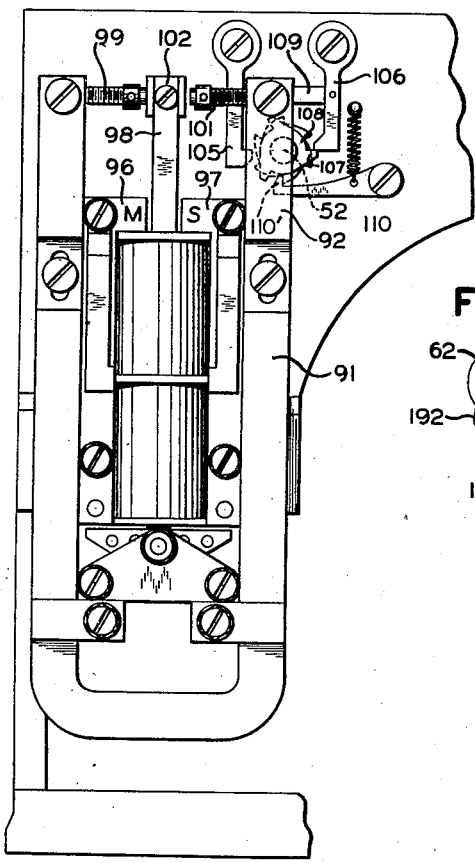
Figure 6 is a side elevational view of the control magnet and escapement mechanism controlled thereby.

The printer is controlled by a single polarized magnet 91 (Figures 1, 3 and 6) carried by a bracket 92 secured to plate 54 by screws 93. Magnet 91 has a pair of opposed pole faces 96 and 97 between which the armature 98 operates. Adjustable stop members 99, 101 control the stroke of the magnet. The construction of the polar magnet forms no part of the present invention and therefore does not need to be described in greater detail.

Figure 17:
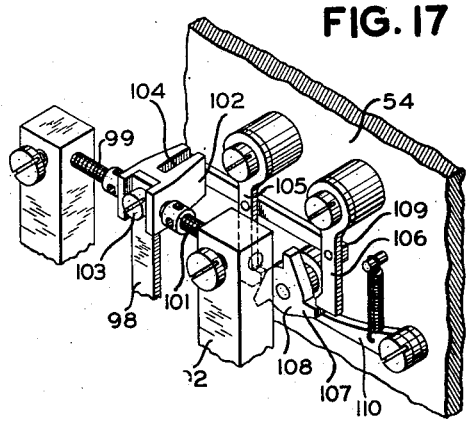
Figure 17 is a perspective view of the armature controlled escapement mechanism.

The upper end of the armature is secured to a block 102 (Figure 17) by a screw 103. The block is recessed at its opposite side, at 104. Pivoted on a pair of posts extending outwardly from plate 54 is a pair of escapement pallets 105, 106 (best shown in Figures 6 and 17) arranged to alternately engage the stop members 107, of an escapement wheel 108 secured to the end of the escapement shaft 52. The pallets are pivoted to a link 109, having a pin 111 (Figure 3) extending into the recess 104 in the armature block 102. Three stops 107 are provided for the wheel 108 so that upon each escapement of the shaft 52, by movement of the armature, either to the right or left, the shaft 52 moves through one-sixth of a revolution.

The shaft 52, it will be recalled, is driven through a friction clutch 45 from the vertical shaft 41. Shaft 52 is normally held at rest, however, by engagement of one of the stops 107 of the escapement wheel 108 with one or the other of the pallets 105, 106. Each time a line reversal occurs, either from marking to spacing or from spacing to marking, the armature 98 is moved against the opposite pole face, rocking the pallets, one away from the wheel 108 and one towards the wheel, thereby escaping the wheel into engagement with the opposite pallet, or a distance of one-sixth of a revolution. The wheel 108 and consequently the shaft 52 may be considered as having six different angular positions, three of which correspond to a marking signal and the remaining three of which correspond to a spacing signal, with the marking and spacing positions alternating. A detent 110 is urged by a spring into engagement with the escapement wheel and upon each escapement of the wheel, the free end of the detent is pulled in behind one of a series of six shoulders 110' on the wheel 108 to prevent bounce or back lash of the escapement wheel when its stop 107 engages the pallets 105 and 106.

In Figure 2 the shaft 52 has secured to it a cam 112 having three shoulders. The shaft rotates in the direction of the arrow shown in Figure 2 and on each movement thereof through a sixth of a revolution, one of the shoulders engages one of the projections 113 or 114, of the rectangular slide 115 and either forces the slide upwardly or downwardly in the guide members 116, 117, in which position it is held by friction until forcefully moved to its opposite position. As the slide 115 reaches the upper or lower limit of its motion, as the case may be, the shoulder engaging with the projection 113 or 114, slides by and the cam 112 comes to rest in position for another of the shoulders to engage the opposite projection, 114 or 113, upon the next escapement of the cam. The upward movement of the slide 115 occurs when a reversal from spacing to marking is received and the downward movement occurs when a reversal from marking to spacing is received. A link 118 is pivoted to the slide 115 and to each of a pair of escapement pallets 119, 121, in turn pivoted to blocks secured to the frame plate 54. The pallets extend to opposite sides of a three toothed escapement wheel 122, fixed on the selector controlling shaft 67.

Also mounted on the shaft 67 is a sleeve 123 (Figure 2) having three vanes 124 extending radially therefrom. These vanes are positioned relative to the escapement wheel 122 so that, as the pallets 119, 121 are raised, in response to a marking impulse, and the wheel 122 thereby escaped into engagement with the lower pallet 121, one of the vanes will be uppermost. When the pallets are moved downward, in response to a spacing signal, the wheel 122 will be escaped into engagement with the upper pallet, and the space between two adjacent vanes will be uppermost. Except as escaped by the pallets in response to reversals of the received impulses, shaft 67 is held at rest by one or the other of the pallets.

Shaft 67, it will be recalled, is driven from gear 66 through a friction clutch 71 of special construction. The purpose of this particular form of clutch is to reduce the lag which otherwise might occur between the movement of the armature to its opposite pole, and the resulting movement of the shaft 67 into its marking or spacing position. With the shaft 67 at rest between reversals, the spring 73 of clutch 71 is tensioned or wound, by the gripping action of the shoe 75 on the inner periphery of the housing 72. After a predetermined tension is thus stored, slippage occurs between the shoe and the clutch housing. Consequently, as the shaft 67 is released by one of the pallets 119 or 121, it is snapped quickly into engagement with the other pallet, by the energy stored in the spring 73.

Mounted upon the selector cam shaft 62 is a series of six cams 125, spaced longitudinally of the shaft and having their raised portions spaced at equal angular distances about the shaft. Disposed beneath each cam so as to be engaged thereby, as the cam shaft rotates, is a selector lever 126. The levers 126 are mounted in slots in a block 127 secured to the side wall 36 of the machine and are urged upward against a stop member 128 by individual springs 129, secured to one end of each lever and to a bracket 131. The opposite ends of the levers are turned downwardly at 132 in alignment with the vanes 124 when disposed in their uppermost position.

Each lever 126 has a control projection 133 in position to be engaged by one of the cams on each revolution of the cam shaft. Thus as the cam shaft revolves, in synchronism with received signals, the levers 126 are depressed in succession. If at the time a particular lever is depressed the vane 124 is uppermost, it blocks downward movement of the left end (Figure 1) of the lever and forms a fulcrum around which the lever pivots, the right end thereof moving downward. If on the other hand the space between two vanes is uppermost when a lever is depressed, there is no opposition to the downward movement of the left end of the lever and it fulcrums about the stop plate 128 causing the left end only of the lever to move downwardly. The selective movement of the right hand end of the levers is downward when a marking signal is received. When a spacing signal is received, the right hand end of the selector lever is held upward in contact with the stop plate 128, by spring 129.

Immediately beneath the right hand end of each selector lever 126 is the horizontal arm 134 of a bellcrank lever, an individual one of which is provided for each selector lever. An individual detent 135 is provided for each of the arms 134, being urged towards the bellcrank arms 134 by individual springs 136. The detent levers are pivoted in the slots of the block 127 and have two recesses or notches 137, 138 therein, in one or the other of which the arms 134 are retained. The levers arms 134 are normally held in the uppermost recess 137 but when engaged by a selector lever 126, as its right hand end moves downward, the arms 134 are moved into engagement with the lower recess 138, in which position they are held until forcefully restored to the upper position.

The lower or vertical arms 139 of each of the bell crank levers control the selective operation of the type wheel positioning mechanism, as will be subsequently explained, but before proceeding to a description of this latter mechanism, a description will be given of the mechanism for maintaining the selecting cams 125 in synchronism with the received impulses.

Correcting apparatus

The present selector differs from that used in the start-stop printers in that the selecting cams do not come to rest following each character selection but operate continuously, being corrected from time to time as required to maintain the cams in synchronism with the received impulses. The correction is effected on the principle of the multiplex correction, that is, by reversals occurring in the line signals, but it differs from the usual multiplex corrector in effecting a correction for every reversal instead of for only reversals from marking to spacing. By thus using the cross over from one line condition to another to control the correction, no special synchronizing or start-stop impulses are required. Accordingly, only character selecting impulses are transmitted over the line, these being received in continuous succession, that is, without any interval between successive groups of character signals. This effects a saving of from 25 to 30% in line time, enabling the printer to operate at a correspondingly higher rate. It also enables the recorder to be more readily operated from multiplex signals over extended channels since it is unnecessary to insert the start and stop impulses therein, as in the present practice.

The selecting cams 125 are preferably rotated slightly faster than the received signals in order that the correction may always be effected by retarding the cams, but of course the correction may be made in a forward direction as well as in a backward one, in which case the cams would be rotated as closely as possible to synchronous speed. In the present embodiment, however, we have shown the correction effected in one direction only through the following mechanism.

Mounted upon the escapement shaft 52 is a disc 141 (Figures 1 and 2) having six radial slots 142 therein separated by radial projections or teeth 143. The disc 141 extends into the path of a series of radial pins 144 extending outwardly from a disc 145 rigidly mounted on the sleeve 146, fixed to the cam shaft 62 to rotate therewith.

Normally, one of the slots 142 is disposed in alignment with the pins 144 so that the pins may pass therethrough, permitting the disc 145 and selecting cams 125 to rotate freely, the cam shaft being driven from gear 61 through the friction clutch 63. Whenever a reversal occurs in the received signals to escape the shaft 52 for one-sixth of a revolution, the succeeding slot 142 of disc 141 is moved into the path of movement of the pins 144. If the disc 145 and consequently the cams 125, are rotating in proper phase relation with the incoming signals, one of the pins 144 will pass through a slot 142 just preceding the escapement of shaft 52. The disc 141, when escaped, rotates at a sufficiently fast rate to position the succeeding slot thereof in alignment with the succeeding pin 144 just as the pin approaches the disc 141. Consequently, the radial projections or teeth 143 of disc 141 do not interfere with the movement of the disc 145 and the rotation of cams 125 is unretarded.

However, if the cams 125 have crept forward slightly, relative to the signals, which is the usual direction of creep, since the cams are operated slightly faster than the signals, the disc 141 will not have completed its rotation into the succeeding position, following a reversal, in time to permit the free passage of the next pin 144, and the approaching pin will contact with the solid portion 143 between the slots, thereby checking the rotation of the cams until the slot moves into alignment with the pin, at which time the pin will pass therethrough and rotation of the cams will be resumed. The retardation of the cams 125 is just sufficient to restore them completely into phase with the received impulses.

It will be noted, therefore, that a correction, if needed, will be applied for every reversal regardless of whether from marking to spacing or from spacing to marking. These corrections may occur as often as six times for a single character (assuming the six unit code is employed) or a correction may not occur for several character code groups if not needed, depending upon the number of reversals occurring in each signal group and the rate of creepage of the cam relative to the signals.

If the line should be idle with either marking or spacing battery continuously applied thereto, one of the slots 142 would be continuously positioned in the path of the pins 144 and the cams 125 would rotate continuously, gradually losing phase with the transmitter. To avoid this difficulty a unison mechanism may be added, of the form shown in our copending application, Serial No. 715,750, filed concurrently herewith. The purpose of the unison mechanism is to stop the cam shaft during idle line periods. We prefer to employ a transmitter, however, which causes frequent reversals to occur in the line signals during idle line time, and thereby maintain the receiver in proper phase relation to the signals.

Type wheel stop mechanism

The type wheel stop assembly 89 comprises a bearing sleeve 151 surrounding the type wheel shaft 85, a cylindrical block 152 surrounding the sleeve 151 and forming a bearing surface for a series of five code disks 153, notched on their outer periphery and a shaft code disk 153'. The disks 153 and 153' are loosely stacked on the periphery of the block 152 with intermediate spacers 154, and are free to rotate through a limited arc. They are retained in position on the block 152 by a pair of annular side plates 155 and 156 secured to the block 152 by screws 157. The plates 155 and 156 are secured in shouldered recesses 158, in a casting 159, mounted on the base 82. The upper walls of the casting 159 extend entirely around the disks 153 and 153', except at the top, at which point an opening 161 is formed through which extend the operating arms 162 of the disks 153 and 153'.

A series of slides 163, individual to each disk 153 and 153', are disposed in slots, in a guide block 165 secured to the upper side of the casting 159. The slides 163 have inverted U-shaped portions 166 engaging the upper rounded ends of the arms 162 of the disks 153 and 153'. A guide comb 167 is also provided for the slides 163, this latter guide being secured to the slotted block 165 by screws 168. The opposite ends of the slides 163 extend adjacent to and in alignment with the vertical arms 139 of the bell crank levers, which it will be remembered were positioned by the selector levers 126. There is one slide 163 individual to each bell crank lever. The bell crank levers control the movement of the slides 163 to shift the disks 153 and 153' in a manner to be described under the heading of Transfer mechanism.

The annular side plates 155, 156 of the assembly are provided with a circular row of radial slots 171, each of which contains an individual stop bar 172, thirty-two of such bars being shown. The stop bars extend across the periphery of the disks 153 and are urged radially towards the disks by two endless spiral springs 173, 174, extending around the group of stop bars. The stop bars are normally held out of the slots of the code disks due to the fact that the notches beneath each bar are not in alignment. As is well known in this type of device, in each of the possible thirty-two relative positions of the disk the slots will be aligned beneath one of the stop bars, which will be forced therein by the action of springs 173, 174.

Radial extensions 175 are provided on the inner ends of each stop bar, these extensions cooperating with a flange 176 on a circular plate 177 to prevent inward canting or tipping of the right hand ends of the stop bars, when a series of notches adjacent that end only are in alignment beneath one of the bars.

The first five disks, counting from the right in Figure 2, are provided with V-shaped notches in accordance with a five unit permutation code, and serve to select thirty-one of the bars 172. The thirty-second bar 172' disposed at the bottom of the disks, is not a stop bar but is used to control the case shift mechanism of the printer. It is cut away opposite the first five disks and has a single projection 178 engaging the periphery of the sixth disk 153'. The disk 153' is of smaller diameter than the disks 153, so as not to interfere with the selections of the stop bars by the remaining disks, and adjacent the shift bar 172' it is provided with a single projection 179 (Figure 16) disposed beneath the bar 172', in one position of the disk, and to one side thereof, in the other position of the disk.

The stop bars 172 extend outwardly beyond the plate 156, intersecting the plane of rotation of the stop arm 181 secured to rotate with the type wheel shaft 85. Normally the stop bars are positioned radially outward beyond the stop arm, but when one of them is selected by alignment of a row of notches in the disks, it moves radially into the path of the stop arm. This radial movement of the stop arm is a bodily movement rather than the pivotal movement usually employed.

The type wheel shaft is driven continuously from the gear 84 through the friction clutch 86, except when stopped by one of the stop bars.

*Transfer mechanism*

Figure 9:
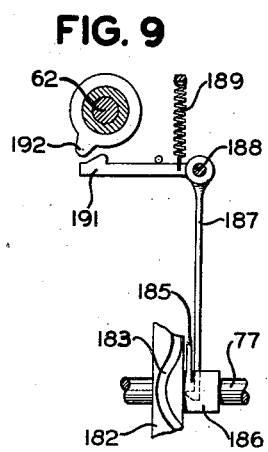
Figure 9 is a side elevation of the mechanism for tripping off the operating cam of the printer from the selecting cam shaft.
Figure 10:
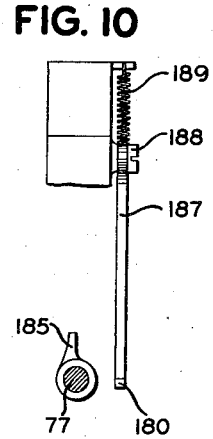
Figure 10 is a front elevation of the trip-off mechanism.

The mechanism for transferring the selection from the vertical bell crank lever arms 139 to the disks 153, 153' comprises a single cam 182 (Figure 1) having a cam track 183 in its periphery and an arcuate cam member 184 secured to one face of the cam disk adjacent the periphery. The cam is secured to the shaft 77 and is rotated in the direction of the arrow, in Figure 1, from the motor shaft 25 through the friction clutch 28 and gears 29 and 76. It is normally held against rotation by a stop arm 185 (Figures 9 and 10) engaging the inturned end 186 of a bell crank lever 187 pivoted at 188 and normally urged into the path of the stop arm 185 by a spring 189. The horizontal arm 191 of the bell crank lever extends beneath a cam 192 fixed on the selector cam shaft 62 and in a predetermined angular position of the selector shaft, trips the lever 187 to release the shaft 77 for a revolution. The shaft 77 comes to rest at the end of the revolution, as stop arm 185 again engages the stop lever.

Each of the slides 163, which operate the notched code disks 153, 153' have a downward projection 193 (Figure 1), which when the slides are shifted to the left, are in position to be engaged by the cam 184, as it rotates past the slides, and shifts them to the right to the position shown in Figure 1.

The bell crank arms, when in unselected or upper position, are disposed to the right of and out of the path of the cam track 183. However, when the vertical arms have been moved by the selector levers 126 to the lowermost position, they are in position to enter the cam track as the cam rotates, the toe portion 194 of the cam entering between the selected and unselected arms 139, and the contour of the cam being such as to first shift the selected arms 139 to the left into contact with the corresponding slide 163 and immediately thereafter to return the bell crank levers to their unselected or upper position, through the heel portion 195 of the cam.

The sequence of operation of the transfer mechanism is as follows: Cam face 184 slightly precedes cam track 183 as the transfer cam rotates. The projections 193 of all slides 163 in the left hand or marking portion are engaged by the cam face 184 and the slides moved to the right one after the other. Almost immediately after the first slide has been positioned in the normal or right hand position, the cam track 183 engages the first bell crank lever, if it has been previously selected, forcing it to the left into engagement with the first slide so as to force the slide to the left to set the corresponding notched disk in marking position. Thereafter each of the selected bell crank arms are engaged in succession to actuate the slides and disks associated therewith. The exact timing of the transfer operation will be described hereinafter under the heading of Operation.

*Shift mechanism*

Figure 18:
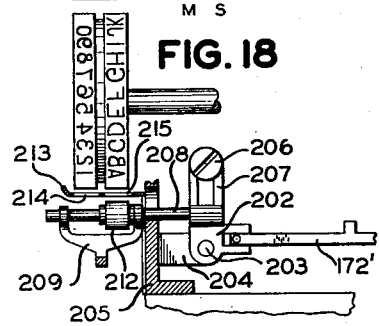
Figure 18 is a detail view of the shift mechanism.
Figure 20:
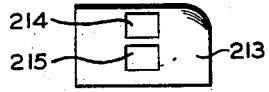
Figure 20 is a plan view of the printing platen guard.
Figure 23:
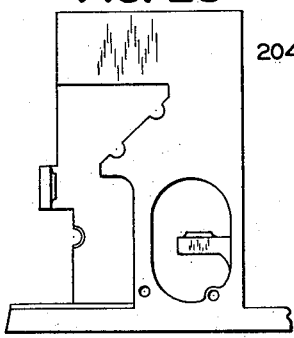
Figure 23 is a front view of the printer frame or casting.
Figure 19:
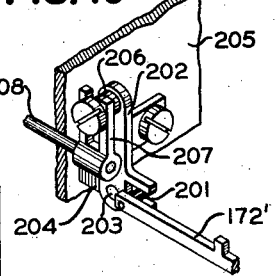
Figure 19 is a perspective view of a portion of the shift mechanism.

It will be recalled that one of the bars 172' surrounding the notched code disks did not engage the first five disks but was controlled by the sixth disk only. When the sixth or shift impulse of the code is spacing, the disk 153' is moved so that the projection 178 of bar 172' engages the raised portion 179 of the disk and when the sixth pulse is marking the bar 172' is moved radially inward against the disk with the lug 178 at one side of the raised portion 179. Referring to Figures 18 and 19 it will be noted that the bar 172', at its outer end, has a pin 201, engaging in the forked arm of a lever 202 pivoted at 203 to a bracket 204 carried by a plate 205, in turn secured to the base 82. At its upper end the lever 202 has a pin 206 engaging in a fork 207, carried on a shaft 208 sliding in a two armed bracket 209. A platen 212 is mounted on the shaft 208.

The parts are shown in Figures 18 and 19 in "letters" case position, that is in position to print from the letters row of the type wheel. This is the position of the platen assumed when the shift bar 172' is engaging the raised portion of disk 153'. In operation upon the reception of the first code combination in which the sixth pulse is of marking character (indicating a figures character) the disk is shifted to remove the cam face 179 from beneath the shift bar, allowing the bar to move radially inward, thereby pivoting lever 202 counter-clockwise (Figure 18), and forcing the shaft 208 to the left to place the platen under the figures character row of the type wheel. On reception of the next letters character, having the sixth pulse spacing, the bar 172' is cammed outwardly by the cam member 179, pivoting the lever 202 clockwise and returning the platen to a position beneath the letters characters.

A shield 213 having two openings 214, 215, in alignment with the letters and figures characters, restricts the impression to one row of characters at a time as the platen moves upwardly by the press mechanism. The shield 213 is carried by the plate 205.

Press mechanism

The press mechanism is best shown in Figure 11. The bracket 209 carrying the platen 212 is turned upwardly from the horizontal lever 216, secured to a shaft 217 (Figure 13), bearing in the front wall of the main casting. Secured to the opposite end of the shaft 217 is a vertical arm 218, the upper end of which is forked. An operating lever 219, pivoted at 220 to the block 127, has two downwardly extending arms, one arm 221 of which engages in the forked end of the lever arm 218 and the other arm 222 of which extends into the path of the transfer cam 184. The arm 222 is positioned immediately ahead of the projections 193 of the disk operating slides 163. Accordingly just prior to engagement of the slides, by the cam 184, this cam engages the arm 222, rocking the lever 219 counter-clockwise and through the levers 218 and 216, throwing the platen 212 upwardly, forcing the tape T into engagement with the type wheel, against the tension of spring 223. By performing the press operation immediately preceding the transfer the type wheel will have the maximum time to assume its printing position, as a result of the preceding transfer, before printing occurs.

Tape feed mechanism

The feeding of the tape occurs during the major portion of each cycle, being stationary approximately only for the period of the press operation. It is controlled from the transfer cam shaft 77 by a cam 224 (Figure 12) rigidly mounted thereon. A U-shaped lever 225 pivoted at 226 has its longer arm 227 in engagement with the working face of cam 224. A link 228 connects the shorter arm 229 of lever 225 with an inverted U-shaped lever 231 loosely mounted on a shaft 232 journaled in the plate 205 (Figure 13) and extending therethrough. A ratchet wheel 233 is fixed on the shaft 232 and is engaged by a pawl 234 carried by lever 231. A holding pawl 235 is urged against the teeth of the ratchet wheel by a spring 236.

A tape feed roller 237 (Figures 11 and 13) is mounted on the shaft 232 outside of the plate, the tape T passing between the roller 237 and a cooperating pressure roller 238 and thence beneath the guide 213. The tape is drawn from a suitable reel, not shown, being pushed in the direction of the arrow, in Figure 11, by the roller 237.

The arm 227 of lever 225 is held in contact with cam 224 by a spring 239. The cam is so arranged that during the press operation, the raised portion thereof, forces the lever sharply to the right (Figure 12) moving the pawl carrying the lever 231 therewith and withdrawing the pawl 234 to the succeeding tooth of the ratchet wheel. This movement is fairly rapid. Following the completion of the press stroke, the cam 224 permits the levers 225 and 231 to move slowly to the left, under action of spring 239, slowly rotating the ratchet wheel 233 and with it the tape feed roller 237. This movement takes substantially all of the time up to the succeeding press stroke. Consequently the tape is ejected at a slow even rate from the printer with almost imperceptible interruptions during the press operations. The tape is thus rendered very easy to read and is particularly suitable for projection purposes in which any intermittent or jerky movement of the tape is greatly magnified.

Operation

Having described all of the essential parts of the printer, the operation thereof will now be explained with reference to a particular example. Assume a number of code combinations of six impulses each are transmitted in continuous succession, that is, with the interval between the last impulse of one combination and the first impulse of the succeeding combination equal to the interval between adjacent impulses of the same combination. Further assume, by way of example, that the first of these combinations is composed of the following impulses: (1) marking, (2) marking, (3) spacing, (4) spacing, (5) marking, (6) spacing.

With the selector cam shaft 62 rotating in phase with the incoming signals, the number 1 cam (nearest the right in Figure 2) will be approaching the number 1 selector lever 126, as the first (1) marking impulse is received. If the last impulse of the preceding impulse was of spacing character, this (1) marking impulse will actuate the armature of the line magnet to its marking side M (Figure 6) escaping the shaft 52 for one-sixth of a revolution. The corrector disk 141 is thus rotated with shaft 52 applying a correcting face to the cam shaft 62, if correction is required, insuring that the number 1 cam 125 will engage its selector lever 126 at the right instant. At the same time the shouldered wheel 112 on shaft 52 engages the righthand lug 113 of slide 115, raising the same and escaping the selector controlling shaft 67 for a sixth of a revolution, that is, until it is stopped by the lower escapement arm 121. One of the vanes 124 will thus be positioned beneath the left end of the selector levers 126. Immediately thereafter the number 1 cam engages the number 1 selector 126 depressing its right end and forcing the arm 134 of the corresponding bell crank lever into its lower detent 138, thereby positioning the vertical arm 139 thereof in the path of transfer cam track 183.

The second impulse also being marking the armature remains on its marking side, corrector disk 141 remains stationary as does the selector controlling shaft 67. Consequently as the number 2 selector cam 125 engages its selector lever 126, the right hand end of this lever will be depressed, setting the number 2 bell crank lever in selected position.

The third (3) impulse being spacing, moves the magnet armature to its spacing side, again escaping shaft 52 for one-sixth of a revolution, as a result of which the corrector disk 141 applies a correction, if required, to the selector cam shaft. At this time the shouldered wheel 112 engages the left lug 114 of slide 115, forcing it downward, thereby escaping wheel 122 from the escapement pallet 121 and setting pallet 119 to stop the shaft 67 with the vanes 124 out of alinement with the selector levers. Consequently as the number three cam engages its corresponding lever 126, the left end thereof moves freely downwardly, the right end remaining in its upward position. Therefore, the number 3 bell crank remains unoperated.

The fourth (4) impulse being also spacing, the shaft 52 is not escaped and no correction is applied to the selector cam shaft. The control shaft 67 also remains in its previous position and, therefore, the number 4 cam is ineffective to operate its corresponding bell crank lever.

The fifth (5) impulse being marking, shaft 52 is again escaped, a correction is applied to shaft 62 and one of the vanes 124 is inserted beneath the levers 126 as the fifth cam engages its selector lever. Therefore, the fifth bell crank is moved to its downward or selected position.

The sixth (6) impulse being spacing, shaft 52 is escaped again, another correction is applied to the selector cam shaft and the vanes 124 are removed from beneath the selector levers. The number 6 cam therefore does not actuate its bell crank.

During the reception of the first code combination, it will be seen that four corrections were applied to the cam shaft, and that bell cranks corresponding to impulses 1, 2 and 5 were moved to selected position.

Figure 21:
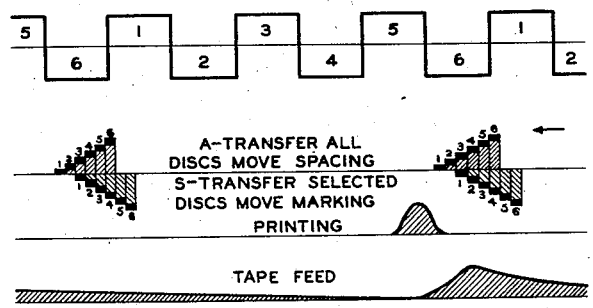
Figure 21 is a timing diagram showing the time relation of the various operations of the printer relative to the received signals.

At the end of the reception of the fourth impulse, that is, just following the operation of the fourth selector lever 126, the cam 192 (Figure 9) on the selector cam shaft engages the trip lever 191 to free the transfer cam 182 for one revolution. As cam 182 starts rotation the cam face 184 (Figure 11) first engages the extension 222 of the press lever 219 to print the selection previously set up in the code disks 153. Referring to the timing diagram (Figure 21) the printing stroke occurs during the reception of the last half of the fifth impulse.

Immediately thereafter, that is, at the beginning of the sixth impulse (see timing diagram) the number 1 slide 163 is engaged by cam 184 and drawn to the right, restoring the number one disk to normal position. The restoration of the numbers two, three, four, five and six disks follows in rapid succession, the entire six disks being restored substantially during the reception of the sixth impulse. This is shown in the timing diagram by the upwardly stepped elements which, above the axis, indicate the time of restoration of the six selecting disks. The downwardly stepped elements, below the axis, indicate the time of reoperation of the disks.

Almost immediately after the first disk has been restored to its normal or spacing position by cam 184, the first bell crank arm 139 is engaged by cam track 183 and forced to the left, shifting the disk to its marking position. The second bell crank is engaged immediately thereafter to move the second code disk to marking position. The third and fourth bell crank levers, being unselected in the example assumed, do not enter the cam track 183 and their corresponding disks remain in their spacing position. Bell crank number 5 was selected, however, and therefore the number 5 disk is moved to marking position. The sixth disk remains in spacing position.

The operation of the disks by cam 183 occurs between the middle of the sixth impulse and the middle of the first impulse of the following combination. By thus extending the operation of the disks from the sixth impulse of one code combination into the time of reception of the first impulse of the next combination, no overlap mechanism is required. The selection stored in the number one bell crank lever is transferred to its associated code disk and the bell crank restored to its upper or normal position before the first impulse of the following combination is received. At the same time, the transfer of the selection stored in the number six bell crank is delayed until after the sixth impulse has been fully received and the sixth bell crank has been operated in accordance therewith.

Therefore, even with the selecting impulses of one code combination following immediately after those of another combination, the selecting levers 126 and their associated bell crank levers are always in readiness to be operated in accordance therewith.

It should be noted that the disks 153 and their corresponding bell crank levers are all restored to spacing position for each character printed, and the selected ones thereof again actuated to marking position. All operations of the disks and bell cranks are progressive or successive as the cams 184 and 183 rotate past the slides 163 and bell crank arms 139.

The disks 153 are provided with V-shaped notches and the inner edge of the stop bars 172 are beveled so that as the disks are restored to spacing position by cam 184, the previously selected stop bar is forced out of the notches of the disks. This occurs, of course, when the first disk is restored to its normal or spacing position. After the disks have been completely reset, another stop bar will drop into the alined notches. Between the restoration of the first disk to spacing and the reoperation of the last disk, there is no definite selection set up in the disks. Certain of them may be moving to spacing position while others are being reset to marking position. Since during this transfer interval the disks are at no time stationary, there is no definite alinement of notches and no stop bar is selected until the transfer is completed.

In the example assumed, the numbers 1, 2 and 5 disks were set in marking position and the numbers 3, 4 and 6 disks were set in spacing position. The first five disks select one of the stop bars 172 for movement into the path of the stop arm. The rate of rotation of the type wheel shaft is sufficient to enable the stop arm to rotate from its last position into contact with the selected stop bar in sufficient time to permit the type wheel to settle down before the press operation occurs. The rotational period of the type wheel is from the beginning of the sixth impulse of one combination to the middle of the fifth impulse of the following combination.

The sixth disk being in spacing position, sets the platen 212 under the letters character of the type wheel, as described.

As the fifth impulse of the succeeding combination is received the cam 184 trips the press mechanism, effecting printing from the selecting character in the letters row. The tape feed starts immediately after the press and continues until just preceding the next press operation.

Continuous transmitter

Figure 22:
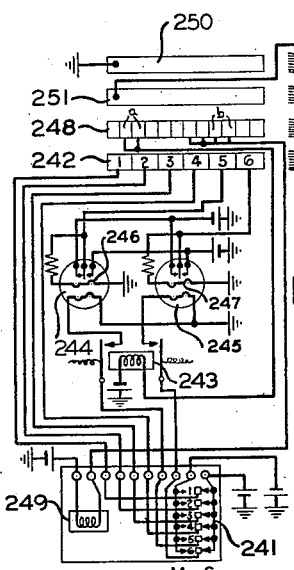
Figure 22 is a wiring diagram of a transmitting apparatus for sending continuous selecting signals to the printer.

In Figure 22 we have shown a continuous transmitting arrangement whereby signals may be sent out from a single tape in continuous succession, that is, without start-stop or other synchronizing intervals therebetween. A tape transmitter 241, is shown, having six transmitting contact tongues numbered 1 to 6, operating between marking and spacing bus bars M and S, respectively. Tongues 1, 2, 3 and 4 are connected directly to the correspondingly numbered segments of ring 242 of a transmitting distributor. Tongues 5 and 6 are connected through the contacts of a relay 243 and the operating windings of polarized storage relays 244 and 245, respectively. The relays 244 and 245 are each provided with locking windings 246, 247, respectively, connected to the tongues of the respective relays. The opposite contacts of the relay have marking and spacing battery, respectively, connected thereto. Tongue of relay 244 is connected to segment 5 of ring 242 and tongue of relay 245 is connected to segment 6 of this ring. A local ring 248 has segments $a$ connected to the winding of relay 243 and segments $b$ connected to the winding of the tape stepping magnet 249. Solid local ring 250 is grounded and solid transmitting ring 251 is connected by line L to the line magnet 91 of the receiving printer. Brushes $B_1$ and $B_2$ bridge rings 242, 251 and 248, 250, respectively. The brushes rotate continuously over the rings of the distributor.

The operation of the transmitter is as follows: Assume a new combination has just been stepped into the transmitter. The contacts 1 to 6 will be set up in accordance with the perforations in the tape. The signal conditions set upon tongues 1 to 4 will be set up directly on segments 1 to 4 of ring 242.

As the brush $B_1$ passes segments 1, 2, 3 and 4 the impulses set up thereon will be transmitted to line. During this time brush $B_2$ passes segments $a$ operating relay 243 and momentarily closing the circuits to relays 244 and 245, from tongues 5 and 6. The operating windings of these relays predominate over the locking windings, so that they take a position corresponding to the position of transmitter tongues 5 and 6. These relays lock up through their windings 246, 247, respectively, and apply signalling condition corresponding to the setting of tongues 5 and 6 onto segments 5 and 6. Consequently as brush $B_1$ continues over these last two segments, the remainder of the combination is transmitted. As the fifth impulse is being sent out from relay 244, brush $B_2$ crosses the $b$ segments of local ring 248, causing operation of the tape stepping magnet, thereby advancing a new combination. This operation is completed before the brush $B_1$ again engages segment 1 of ring 242. Consequently successive code combinations composed of selecting conditions only follow each other over the line L, in continuous succession.

Start-stop operation of printer

In Figures 14 and 15 we have shown a modification permitting the printer to be operated on start-stop signals instead of continuous character selecting signals only. In start-stop operation the selector cam shaft 62' is stopped for the rest impulse, and rotates idly for the period of the start impulse. Accordingly the six selecting cams 125' are arranged in six-seventh of the circumference of the shaft 62', the seventh position being vacant. A pin 144' is provided on the disk 145' for each of the seven unit angular positions of the cam shaft. One of the pins 144" is longer than the others and is disposed so as to engage the corrector disk 141' when the blank area of the cam shaft is approaching the selector levers 126. The disk 141' is similar to disk 141, having 6 slots thereon. Three alternate slots 142' of the disk are of greater depth than the rest and serve to permit passage of the long pin 144". The remaining pins 144' may pass through any of the slots.

The deep slots 142' correspond to spacing impulses, that is, they are positioned in the path of the pins 144' and 144" whenever a spacing signal is received. The shallow slots correspond to marking signals. The start-stop signals comprise a start impulse of spacing character, a group of six code impulses and a rest impulse of marking character. During the rest impulse the disk 141' is positioned with one of the shallow slots in the path of the disk 145' with the long pin 144" in contact therewith and consequently with the cam shaft 62' at rest. The start impulse of the succeeding combination being spacing, escapes the disk 141' to bring one of the deep slots in the path of the pin 144" and the pin is permitted to pass therethrough and rotation of the cam shaft is started in phase with the signal group. During the period of the start impulse, the blank space of the cam assembly rotates past the selector levers 126 and they remain unoperated. During the reception of the succeeding six code impulses the disk 141' is moved into marking or spacing positions, depending upon the nature of the signals, and cams 125' are rotated past their individual selector levers, in phase with the signals, the cam shaft being corrected by the disk 141' each time a reversal occurs in said code signals. At the end of the sixth or last code impulse, the long pin 144" will be approaching the disk 141' and as the rest impulse, of marking character, is received the disk 141' is escaped to bring a shallow slot in line with the long pin, thereby stopping the cam shaft until the next start impulse is received.

It will be noted, therefore, that the only changes necessary to convert the printer from continuous operation, to start-stop operation, is to change the disk 145 for disk 145' and to substitute the cams 125' for cams 125. The same corrector disk 141', having deep and shallow slots, may be employed with either type of operation.

It will be evident that various changes may be made in the details of construction shown and described within the scope of the appended claims.

What we claim is:

1. In a telegraph recorder, a selecting mechanism, a rotary shaft, mechanical means operated thereby for operating said selecting mechanism, and means responsive to received character selecting line current impulses for selectively controlling the operation of said selective means and for maintaining such shaft in synchronism with said impulses.

2. In a telegraph recorder for permutation code signals comprising a uniform number of two different line conditions for each character code group, a selecting cam shaft having a plurality of cam faces equally spaced about the periphery thereof, a plurality of selector members equal in number to the number of selecting conditions in each group, said selector members being operable a successive number of times under control of said cam faces in cyclic order in response to successive character code groups of signals, with a period between adjacent selecting conditions of different signal groups equal to the period between successive selecting conditions of the same group and recording means controlled by said selector members to record a character for each character code group received.

3. In a telegraph recorder for permutation code signals comprising a uniform number of two different line conditions for each character code group, a rotary selector shaft, a plurality of selector members equal in number to the number of selecting conditions in each group, means for operating said selector members sequentially a successive number of times in cyclic order in response to successive character code groups of signals, with the period between adjacent selecting conditions of different groups equal to the period between successive selecting conditions of the same group, a correcting element for maintaining said shaft in synchronism with received line selecting conditions and means for actuating said correcting element to apply a corrective force to said shaft in response to reversals in line signal conditions.

4. In combination a source of signals comprising successive groups of solely character selecting conditions received in continuous succession, a telegraph receiver, a selecting mechanism therefor, a rotatable shaft for said selecting mechanism, solely mechanical means controlled jointly by said signals and said rotatable shaft for selectively operating said selecting mechanism and means controlled during the reception of a character code group of selecting conditions for applying corrective force to said shaft to maintain the same in synchronism with the received signals.

5. In a telegraph receiver responsive to permutation code signals comprising a uniform number of two different line conditions for each character code group, a plurality of selector members, a rotary cam shaft for controlling the operation of said selector members in cyclic order, said shaft being normally free to rotate in substantial synchronism with received signals, and means for momentarily retarding the rotation thereof during reception of each character code group whenever said shaft gains in phase relative to said signals.

6. In a telegraph receiver, a plurality of selector members, a rotary shaft for controlling the operation of said selector members in cyclic order, said shaft being normally free to rotate in substantial synchronism with received signals, and a second shaft controlled by received line impulses and cooperating means on each of said shafts for maintaining said rotary shaft in synchronism with received line current impulses.

7. In a telegraph receiver, a plurality of selector members, a rotary shaft for controlling the operation of said selector members in cyclic order, said shaft being normally free to rotate in substantial synchronism with received signals, a second rotary shaft normally at rest, means for momentarily rotating said second shaft upon each reversal of line signalling conditions, a baffle member carried by said second shaft, a cooperating baffle member carried by said first shaft, said baffle members being arranged to freely pass each other during the rotation of said shafts when the first shaft is in synchronism with the received signals, and to engage each other to retard the movement of the first shaft when said first shaft gains in phase relative to the received signals.

8. In a telegraph receiver, a plurality of selector members, a rotary shaft for controlling the operation of said selector members in cyclic order, said shaft being normally free to rotate in substantial synchronism with received signals, a second rotary shaft, a magnet responsive to received line impulses, a source of power for driving said second shaft, an escapement mechanism normally retaining the second shaft at rest, said escapement being released by said magnet to permit movement of the second shaft whenever reversals occur in the signaling conditions, and means controlled by said second shaft during said momentary rotation for applying a corrective force to said first shaft to maintain the same in synchronism with the received line current impulses.

9. In a telegraph receiver, a plurality of selector members, a rotary shaft for controlling the operation of said selector members in cyclic order, said shaft being normally free to rotate in substantial synchronism with received signals, and a correcting member movable into marking and spacing positions in response to received line current impulses and serving during the movement from one position to the other to apply a corrective force to said shaft to retain the same in synchronism with the received impulses.

10. In a telegraph receiver, a mechanical selecting mechanism having a substantially continuously rotating shaft, a correcting mechanism for maintaining such shaft in synchronism with received line current impulses, and a single magnet for controlling both the selecting and correcting mechanisms.

11. In a telegraph receiver, a magnet responsive to line current impulses, a shaft operated thereby into marking and spacing positions, a plurality of selector members, a cam shaft rotatable in substantial synchronism with said received line current impulses for controlling the operation of said selector members, said first shaft controlling both the selective positioning of said selectors and the synchronous relation of said cam shaft relative to the received impulses.

12. In a telegraph receiver, a first group of selecting members, a second group of selecting members, means for selectively positioning said first group of selecting members in cyclic order in response to received line current impulses, transfer means for transferring the selection set up on said first selecting members to said second selecting members, the transfer of the first selecting member of the first group being completed prior to the selective operation of the last selecting member of the first group, whereby said first member of the first group is conditioned to respond to a new selecting condition immediately upon operation of the last selecting member of the first group, and printing means controlled by said second group of selecting members.

13. In a single channel printing telegraph, means to transmit a series of permutation code signals so that the interval between the last impulse of one signal and the first impulse of the next signal is the same as the interval between succeeding impulses in the same signal; a single magnet responsive to said signals; and receiving mechanism embodying permutation code elements controlled through solely mechanical connections by said magnet and operative to effect printing of a received character while the succeeding character is being received.

14. Signal receiving apparatus comprising a series of selector elements, a receiving magnet, a shaft movable into different angular positions under control of said magnet, means independent of said shaft to actuate said elements, and means on said shaft cooperating with said selector elements to modify the motion of said elements.

15. A telegraph receiving apparatus comprising a series of elements having two varieties of motion but normally restrained from motion, means operative to actuate such elements in successive order and signal controlled power operated means to positively restrain said movement of said elements in one variety of motion and to compel a movement of said elements in the other variety of motion in combinations according to signals received.

16. Signal receiving apparatus comprising a series of movable selector levers, a corresponding series of cams movable past said levers in succession in synchronism with received line current impulses, a second shaft, means on said second shaft movable into and out of the path of movement of said selector levers, said second shaft being controlled by received line current impulses whereby to control selectively the movement of said levers under the action of said cams.

17. Signal receiving apparatus comprising a series of selector levers, a series of selectors actuated thereby, means invariably to move said levers in succession, a receiving magnet and power-driven means controlled by said magnet for rendering said levers effective or ineffective on said selector members.

18. In a telegraph receiver, a plurality of selectors, an operating magnet, a rotatable cam shaft, means associated with said selectors and movable into marking and spacing positions under the control of said magnet to determine the selective operation of said selectors by said cam shaft, a spring for driving said means, means normally holding said first means at rest against the force of said spring, means for releasing said first means for movement into a new position upon each reversal of line signaling conditions, and recording means controlled by said selectors.

19. A telegraph receiver comprising a type wheel, a series of movable selecting elements, a line magnet, means controlled by said magnet for operating said selecting elements in succession, in combinations according to the signals received, a second series of elements corresponding in number to the selecting elements, and operable in succession by said selecting elements in combinations corresponding to those of the selecting elements, and means controlled by said second series of elements to stop the type wheel in a printing position corresponding to the signal received.

20. A telegraph receiver comprising a type wheel, a series of movable selector elements having two varieties of motion but normally restrained from movement by unequal pressure at two points, means operating to move said elements in succession, means to positively restrain said movement of said elements in the motion of least normal restraint and to compel movement thereof in the motion of greater normal restraint, in combination according to the signals received, a plurality of notched code disks, power means for setting said disks in combination according to the position of said elements and means controlled by said disks for stopping said type wheel in printing position.

21. In a telegraph receiver, a plurality of selectors, means for positioning said selectors into marking and spacing positions in combinations in accordance with received signals, a plurality of permutation elements having normal and operated positions and means for moving said elements to their normal position, in succession and for then moving them into their operated position, in succession in combinations according to the position of said selectors, the successive movements of said elements into normal and operated position being overlapped whereby certain of said permutation elements are being restored to normal position while others are being moved to operated position.

22. In a telegraph receiver responsive to successive groups of solely character selecting conditions received in continuous succession, a series of selectors corresponding in number to the number of impulses in each signal group, means for operating said selectors in continuous succession, in combinations in accordance with received signals, with the period between operation of adjacent selectors equal to the period between the operation of the last selector of the series and the subsequent operation of the first selector of the series, a plurality of permutation elements, means controlled by said selectors for operating said elements in succession in accordance with the position of said selectors, the operation of said elements occupying a portion of the time of reception of the last impulse of one group and the first impulse of the succeeding group and each selector being free for reoperation prior to the reception of the impulses to which it corresponds.

23. In a printing telegraph receiver, a plurality of notched disk selectors, a plurality of stop members arranged about the periphery of said disks, means for operating said disk members sequentially in combinations in accordance with received code combinations to bring certain of said notches into alignment, means for moving one of said stop members into the aligned notches, a type wheel and means engaged by said selected stop member for stopping the type wheel in one printing position, the notches of said disks and stop members having cooperating cam surfaces whereby the notched disks are moved into a different position the previously selected stop member is forced out from the notches thereof.

24. In a printing telegraph receiver a plurality of notched disk selectors, a plurality of stop members arranged about the periphery of said disks substantially parallel to the axis thereof, means for operating said disks sequentially in combinations in accordance with received code signals to bring certain of said notches into alignment, means for bodily moving one of said stop members into the aligned notches while maintaining the same parallel to the axis of the disks, a type wheel and means engaged by said selected stop member for stopping the type wheel in one printing position.

25. In a telegraph printer a plurality of primary selectors, a notched code disk corresponding to each selector, means for setting said selectors in combinations in accordance with received code signals, a cam for operating said disks in accordance with the positioning of said selectors, a type wheel, positioning means therefor controlled by said disks, a press mechanism and means including said cam for operating said press mechanism immediately preceding the operation of said disks.

26. In combination, a source of signals comprising permutations of a definite number of code impulses preceded by a start impulse and followed by a rest impulse, a selecting mechanism, means responsive to said start impulse for starting said selecting mechanism into operation, means for operating said selecting mechanism in substantial synchronism with said code impulses, means for bringing said selecting mechanism to rest during said rest impulse and means for applying a correcting force to said selecting mechanism during the period of reception of said code impulses.

27. In combination, a source of signals comprising permutations of a definite number of code impulses, a selecting mechanism having a rotatable member, means for starting said member into rotation at the beginning of each character signal and arresting the same at the end of each character signal, and means for applying a correcting force to said rotatable member at intermediate points in its rotation.

28. In a telegraph recorder, a selecting mechanism, a rotary cam shaft for controlling the operation of said selecting mechanism, a magnet responsive to line current impulses and means controlled by said magnet upon each reversal of line current impulses for applying a synchronizing force to said shaft.

29. In a telegraph recorder, a selecting cam shaft, a plurality of selector members mechanically operable by said cam shaft, a correcting element for maintaining said shaft in synchronism with received line impulses and means for actuating said correcting element to apply a corrective force to said shaft, if required, upon each change of line signal conditions.

30. In a telegraph recorder, a rotary selector shaft, a plurality of selector members mechanically operable a successive number of times by said shaft in cyclic order in response to successive character code groups of signals, with the period between adjacent impulses of different groups equal to the period between successive impulses of the same group, and mechanical means for maintaining said shaft in synchronism with said received signals.

31. In a telegraph receiver adapted to receive signals comprised of a continuous succession of groups of solely character selecting conditions, a mechanical selecting mechanism therefor, a rotatable shaft for said selecting mechanism, means controlled jointly by said signals and said rotatable shaft for selectively operating said selecting mechanism and other means controlled solely by said signals for maintaining said shaft in synchronism with the received impulses.

32. In a telegraph receiver adapted to receive signals comprised of a continuous succession of groups of solely character selecting conditions, a mechanical selecting mechanism therefor, a rotatable shaft for said selecting mechanism, means controlled jointly by said signals and said rotatable shaft for selectively operating said selecting mechanism and a correcting mechanism for said shaft responsive to reversals of said signal impulses for applying a corrective force to said shaft.

33. In a telegraph receiver adapted to receive signals comprised of a continuous succession of groups of solely character selecting conditions, a mechanical selecting mechanism therefor, a substantially continuously rotatable shaft for said selecting mechanism, means controlled jointly by said signals and by said rotatable shaft for selectively operating said selective mechanism and means for restoring said shaft into synchronism with the received impulses whenever it advances in phase relative thereto.

34. In a telegraph reciver adapted to receive signals comprised of a continuous succession of groups of solely character selecting conditions, a mechanical selecting mechanism therefor, a rotatable shaft for said selecting mechanism, a continuously operable driving means for said shaft, means controlled jointly by said signals and said rotatable shaft for selectively operating said selective mechanism and means for altering the angular position of said shaft independently of said driving means to restore the same into synchronism with received line impulses whenever the shaft tends to vary in phase relative thereto.

35. In a telegraph receiver, a plurality of selector members, a rotary shaft for controlling the operation of said selector members in cyclic order, said shaft being normally free to rotate in substantial synchronism with received signals, a second rotary shaft controlled by received line impulses and intermeshing means carried by said shafts, said means permitting the free rotation of the first shaft when the same is in phase with the received line impulses and modifying the movement of the first shaft when the same varies from such synchronous relation with the received line impulses.

36. In a telegraph receiver, a plurality of selector members, a rotary shaft for operating said selector members in cyclic order, said shaft being normally free to rotate in substantial synchronism with received signals, a second rotary shaft normally at rest, means for rotating said shaft in synchronism with received current impulses, and means on said second shaft cooperating with the first shaft to maintain the later shaft in synchronism with received current impulses.

37. In a telegraph receiver, a plurality of selector members, a rotary shaft for operating said selector members in cyclic order, said shaft being normally free to rotate in substantial synchronism with received signals, a second rotary shaft normally at rest, means for rotating said second shaft upon each reversal of line signaling conditions and means carried by said second shaft adapted to engage said first shaft during such momentary rotation, whenever said first shaft varies from synchronism with the signals, whereby to restore said synchronous relation.

38. In a telegraph receiver, a plurality of selector members, a rotary shaft for operating said selector members in cyclic order, said shaft being normally free to rotate in substantial synchronism with received signals, a second rotary shaft normally at rest, means for momentarily rotating said second shaft upon each reversal of line signaling conditions, a disc carried by each of said shafts, said discs having cooperating projections and being arranged so that upon rotation of said shafts the projections of one disc move freely between the projections of the other disc when said first shaft is in synchronism with the received impulses and so that a projection of one disc engages a projection of the other disc to retard the movement of the first shaft, whenever it gains in phase relative to said signals.

39. In a telegraph receiver, a plurality of selector members, a rotary shaft for operating said selector members in cyclic order, said shaft being normally free to rotate in substantial synchronism with received signals, a second rotary shaft, means controlled by received line impulses for determining the angular position of said second shaft, spaced projections on each of said shafts, the projections on one shaft being adapted to engage those on the other in certain relative angular positions of the two shafts corresponding to a non-synchronous relation of the first shaft to the received signals whereby to restore the first shaft into synchronism with said signals.

40. In a telegraph receiver, a plurality of selector members, a rotary shaft for controlling the operation of said selector members in cyclic order, said shaft being normally free to rotate in substantial synchronism with received signals, a correcting member movable into marking and spacing positions in response to received line current impulses, projections on said correcting member positioned during said movement of the correcting member into the path of said shaft in certain angular positions thereof relative to the received signals, whereby to apply a corrective force to the shaft to restore it into correct phase relation with the signals.

41. In a telegraph receiver, a magnet responsive to line current impulses, a shaft operated thereby into marking and spacing positions, a plurality of selector members, a cam shaft rotatable in substantial synchronism with said received line current impulses for controlling the operation of said selector members, a plurality of baffle member controlled by said first shaft for determining the selective operation of said selector members and a correcting mechanism also controlled by said first shaft for maintaining said cam shaft in synchronism with said received line current impulses.

42. In a telegraph receiver, a group of selectors arranged to be selectively positioned in cyclic order a successive number of times in response to successive groups of character selecting conditions received in continuous succession, a second group of selector members and means for transferring the selection set up in each selector of first group to said second group of selectors prior to the succeeding operation of each of said first selectors.

43. In a single channel type printing telegraph system, means to transmit a series of permutation code signals so that the interval between the last impulse of one signal and the first impulse of the next signal is the same as the interval between succeeding impulses in the same signal; a single magnet responsive to said signals; and a type printing receiver comprising solely mechanical elements connected to said magnet to effect the printing of characters, corresponding to the permutation code signals received by said magnet.

44. In a single channel telegraph system, means to transmit a series of permutation code signals so that the interval between the last impulse of one signal and the first impulse of the next signal is the same as the interval between succeeding impulses in the same signal; a single magnet and a receiver embodying permutation code elements and solely mechanical means associated with said magnet for selectively controlling said permutation code elements to effect recording in accordance with one received permutation code signal, while a succeeding permutation code signal is being received.

45. A telegraph receiver comprising a series of selector elements having two varieties of motion, means to normally restrain said elements from motion by unequal pressure at two points, a series of rotating cams arranged to move said elements in succession, a power-driven shaft selectively positioned in accordance with received line current impulses, means on said shaft common to all of said elements and comprising a stop to positively restrain the movement of said elements by said cams in the motion of least normal restraint and to compel said movement in the motion of greater normal restraint, in combinations according to the signals received.

46. Selective signal apparatus comprising selecting mechanism including a plurality of elements each having two varieties of motion and normally less restrained from one variety of motion than from the other, electrically operated selective means comprising a shaft having a radial member movable into and out of the path of movement of said member, signal responsive means for controlling the movement of said shaft whereby to oppose the movement of said element in the motion of least normal restraint to cause the same to move in the motion of its greater normal restraint.

47. Signal receiving apparatus comprising a series of movable selector levers, means operating in substantial synchronism with received line current impulses for selecting said levers in succession for movement, a power-driven abutment movable into and out of the path of movement of said levers to restrict the movement thereof, and means for controlling such movement of said abutment in accordance with received line current impulses.

48. Signal receiving apparatus comprising a series of selector levers, a series of selectors actuated thereby, means invariably to move said levers in succession, a receiving magnet, a power-driven shaft, escapement means for said shaft, controlled by said magnet, and means selectively actuated by said shaft for rendering said levers effective or ineffective on said selectors in accordance with received line current impulses.

49. In a telegraph receiver, a plurality of selectors, an operating magnet, a rotatable cam shaft, a baffle member common to said selectors and movable into marking and spacing positions to determine the selective operation of said selectors by said cam shaft, a power-driven shaft, an escapement normally retaining said shaft at rest in one angular position, said escapement being controlled by said magnet to release the shaft for movement into a different angular position upon each reversal of line conditions and means on said shaft operatively associated with said baffle member to actuate the same into marking or spacing position, depending upon the angular position of said shaft.

50. In a telegraph receiver, a plurality of selectors, an operating magnet, a rotatable cam shaft, a baffle member associated with said selectors and movable into marking and spacing positions to determine the selective operation of said selectors by said cam shaft, an escapement mechanism controlled by said magnet for escaping said baffle member upon such reversal of line signaling conditions, spring means for driving said baffle member into marking or spacing position when it is escaped and recording means controlled by said selectors.

51. In a telegraph receiver, a plurality of selectors, an operating magnet, a rotatable cam shaft, means associated with said selectors and movable into marking and spacing positions under the control of said magnet to determine the selective operation of said selectors by said cam shaft, a spring for driving said means, means normally holding said first means at rest against the force of said spring, means for releasing said first means for movement into a new position upon each reversal of line signalling conditions, and means for storing power in said spring between reversals of the line signalling conditions.

52. In a telegraph receiver, a plurality of selectors, a rotary cam shaft, a member associated with said selectors and movable into marking and spacing positions to determine the selective operation of said selectors under the control of said cam shaft, means for driving said cam shaft in substantial synchronism with received signals, a line magnet, an escapement mechanism operated by said magnet upon each reversal of line signaling conditions and means controlled thereby for applying a corrective force to said cam shaft and for controlling the movement of said member into marking or spacing position depending upon whether the signal reversal is from a spacing to a marking condition or from a marking to a spacing condition.

53. In a telegraph receiver, a plurality of selectors, a rotary cam shaft, a member associated with said selectors and movable into marking and spacing positions to determine the selective operation of said selectors under the control of said cam shaft, means for driving said cam shaft in substantial synchronism with received signals, a line magnet, an escapement mechanism operated by said magnet upon each reversal of line signaling conditions and means controlled thereby for applying a corrective force to said cam shaft, and a second escapement controlled by the first escapement for controlling the movement of said member into marking or spacing position depending upon whether the signal reversal is from a spacing to a marking condition or from a marking to a spacing condition.

54. In a telegraph receiver, a plurality of selectors, a rotary cam shaft, a member associated with said selectors and movable into marking and spacing positions to determine the selective operation of said selectors under the control of said cam shaft, means for driving said cam shaft in substantial synchronism with received signals, a correcting mechanism for correcting said cam shaft into phase with received signals, an escapement mechanism for operating said correcting mechanism, a second escapement mechanism for controlling the movement of said member into marking or spacing position, and a single line magnet for controlling both of said escapement mechanisms.

55. A telegraph receiver comprising a typewheel, a series of movable selecting elements having two varieties of motion but normally restrained from motion by two unequal pressures, means to positively restrain said movement of said elements in the motion of least normal resistance to compel movement of said elements in the motion of greater normal restrain, in combinations according to the signals received, a second series of elements corresponding in number to the selecting elements and controlled for movement into selected position by said selecting elements in accordance with their movement in that motion of greater normal restraint, and means controlled by said second series of elements to stop the typewheel in a printing position corresponding to the signal received.

56. A telegraph receiver comprising a typewheel, a series of movable selecting elements having two varieties of motion but normally restrained from motion by two unequal pressures, means operating to move said elements in successive order, means to positively restrain said movement of said elements in the motion of least normal restraint and to compel movement thereof in the motion of greater normal restraint, in combinations according to the signals received, a second series of elements corresponding in number to the selecting elements and having normal and operated positions, said second series of elements being movable into their operated position by said selecting levers during their movement in the motion of greater normal restraint, a plurality of notched code discs, power means for setting said discs in combinations according to the position of the elements of said second series, and means controlled by said discs for stopping said typewheel in a printing position.

57. A telegraph receiver comprising a typewheel, a series of movable selector elements having two varieties of motion but normally restrained from movement by two unequal pressures, means to move said elements in succession, means to positively restrain said movement of said elements in the motion of least normal restraint and thus to compel movement thereof in the motion of greater normal restraint, in combinations according to the signals received, a plurality of notched code discs, having normal and operated positions, means for setting said discs in operated position in combination according to the position of said elements, means for moving each of said discs to its normal position preceding the setting thereof and means controlled by said discs for stopping said typewheel in printing position.

58. A telegraph receiver comprising a typewheel, a series of movable selector elements having two varieties of motion but normally restrained from movement by two unequal pressures, means to move said elements in succession, means to positively restrain said movement of said element in the motion of least normal restraint and thus to compel movement thereof in the motion of greater normal restraint, in combinations according to the signals received, a plurality of notched code discs having normal and operated positions, power-driven cam means for moving said discs to their normal position and thereafter for moving them to their operated position in combinations in accordance with the position of said selecting elements, and means controlled by said discs for stopping said typewheel in printing position.

59. A telegraph receiver comprising a series of movable selecting elements, means for operating said elements into marking and spacing positions, in combinations, in accordance with received signals, a second set of elements corresponding in number to the selecting element and having normal and operated positions, means for moving the elements of said second set into operated position in combinations according to the operated position of said selecting elements, means for retaining said second elements in their operated position, a plurality of notched code members, having normal and operated positions, power-driven cam means for first moving said notched code members to their normal position, then moving said notched code members to their operated position in combination in accordance with the position of said second elements and thereafter to restore said second elements to their normal position, and recording means controlled by said notched code members.

60. A telegraph receiver comprising a series of movable selecting elements, means for operating said elements into marking and spacing positions, in combinations, in accordance with received signals, a second set of elements corresponding in number to the selecting element and having normal and operated positions, means for moving the elements of said second set into operated position in combinations according to the operated position of said selecting elements, means for retaining said second elements in their operated position, a plurality of notched code members having normal and operated positions, means for moving said notched code members to their normal position in successive order and for then moving them into their operated position successively, in combinations according to the position of said second elements, the successive movements of said notched code members into normal position and into operated position being overlapped whereby certain of said notched code members are being restored to normal position while others are being moved into operated position.

61. A telegraph receiver comprising a series of movable selecting elements, means for operating said elements into marking and spacing positions, in combinations, in accordance with received signals, a second set of elements corresponding in number to the selecting element and having normal and operated positions, means for moving the elements of said second set into operated position in combinations according to the operated position of said selecting elements, means for retaining said second elements in their operated position, a plurality of notched code members, having normal and operated positions, means for moving said notched code members to their normal position in successive order and for then moving them into their operated position successively, in combinations according to the position of said second elements and then moving the elements of said second set to normal position in successive order, the successive movements of the notched code members into normal and operated position and the movement of the elements of the second set into normal position being overlapped whereby the first element of the second set is restored to normal prior to the movement of the last notched code member into operated position.

62. In a telegraph receiver, a plurality of selectors having normal and operated positions, means for actuating said selectors into operated position, in combinations in accordance with received signals, a plurality of code discs having normal and operated positions and cam means for moving said code discs to normal, moving them again to operated position in combinations according to the position of said selectors and moving said selectors to normal positions, each of said movements being successive and overlapped whereby certain of said selectors are returned to normal position while the discs corresponding to other selectors are being moved to their operated position.

63. In a telegraph system responsive to successive groups of solely character selecting conditions received in continuous succession, a series of selectors corresponding in number to the number of impulses in each signal group, means for operating said selectors in continuous succession in combinations in accordance with received signals, with the period between operation of adjacent selectors equal to the period between the operation of the last selector of the series and the subsequent operation of the first selector of the series, a plurality of code discs, means controlled by said selectors for operating said discs in succession, in accordance with the position of said selectors, the operation of the first disc being completed and the first selector being freed for a subsequent operation during the period of operation of the last selector.

64. In a telegraph receiver, a plurality of selectors having normal and operated positions, means for positioning said selectors in operated position in combinations in accordance with received signals, a plurality of code members having normal and operated positions, means for moving said code members in succession into normal position, means for moving said code members in succession into operated position and means for moving said selectors in succession into normal position, the movement of the first code member into operated position occurring after the movement thereof into normal position and prior to the movement of the last code member into normal position, and the movement of the first selector into normal position occurring after the movement of the first code member into operated position and prior to the movement of the last code member into operated position, the period of such movement of the code members and selectors being materially less than the period of reception of a character signal, printing means controlled by said code members and means for operating said printing means between successive operations of said code members.

65. In a printing telegraph receiver, a plurality of notched disc selectors having normal and operated positions, a plurality of stop members arranged about the periphery of said discs, means for moving said discs into operated position in combinations in accordance with received code signals to bring certain of said notches into alignment, means for moving one of said stop members into the aligned notches, a typewheel, means engaged by said selected stop member for stopping the typewheel in one printing position, means for affecting printing from said typewheel in said position, and means operative following the printing of each character for returning said discs to their normal position, the notches of said discs and the stop members having cooperating cam surfaces whereby as the notched discs are moved to normal position the previously selected top member is forced out from the notches thereof.

66. In combination, a plurality of notched selector discs having normal and operated positions, typewheel stop members extending across said discs and arranged around the periphery thereof, the notches of the discs being so formed that for each setting of the discs a notch in a disc is in alignment with a notch in each of the other discs, spring means normally urging each of said stop members toward said discs whereby the stop member opposite said aligned notches moves therein, means for returning said discs to normal following the selection of said stop member, said notches and stop members having cooperating cam surfaces whereby on the movement of said discs to normal position the previously selected stop member is cammed out from the notches thereof.

67. In combination, a plurality of notched selector discs having marking and spacing positions, typewheel stop members extending across said discs and arranged around the periphery thereof, the notches of the discs being so formed that for each setting of the discs a notch in a disc is in alignment with a notch in each of the other discs, spring means normally urging each of said stop members toward said discs whereby the stop member opposite said aligned notches moves therein, means for moving said discs sequentially into marking or spacing position, said notches and said stop members having cooperating cam surfaces whereby on the movement of the first one of said discs, the previously selected stop member is cammed out from the notches thereof.

68. In a permutation code device, a series of notched selecting members, means for operating said selecting members sequentially to align said notches in selective combinations, selectable elements adapted to move into said aligned notches, each selective combination of said selecting members permitting one of said selectable elements to move into selected position, the walls of said notches being operative when the notches are moved out of alignment, to move the element previously selected thereby to its unselected position.

69. In a printing telegraph receiver, a plurality of notched disc selectors, a plurality of stop members arranged about the periphery of said discs substantially parallel to the axis thereof, means for operating said discs sequentially in combinations in accordance with received code signals to bring certain of said notches into alignment, means for bodily moving one of said stop members into the aligned notches, the notches of said discs and the stop member being so shaped and arranged that as the notched discs are moved in response to a succeeding code combination the previously selected stop member is forced out from the notches thereof.

70. In a printing telegraph receiver, a plurality of notched disc selectors, a plurality of stop members arranged about the periphery of said discs substantially parallel to the axis thereof, means for operating said discs sequentially in combinations in accordance with received code signals to bring certain of said notches into alignment, means for bodily moving one of said stop members into the aligned notches, said stop bars having radially extending portions, means engaging said radially extending portions to maintain the stop bars parallel to the axis of the discs during movement into the aligned notches thereof, a typewheel and means engaged by said selected stop member for stopping the typewheel in one printing position.

71. In a printing telegraph receiver, a plurality of notched disc selectors, a plurality of stop members arranged about the periphery of said discs substantially parallel to the axis thereof, means for operating said discs sequentially in combinations in accordance with received code signals to bring certain of said notches into alignment, means for bodily moving one of said stop members radially into the aligned notches, guide means for said stop bars for maintaining the same parallel to the axis of the discs during movement into and out of the aligned notches, a typewheel, and means engaged by the selected stop member for stopping the typewheel in one printing position.

72. In combination a plurality of notched selector discs, typewheel stop members extending across said discs and arranged around the periphery thereof substantially parallel to the axis thereof, the notches of the discs being so formed that for each of a predetermined number of setting of the discs a notch in a disc is in alignment with a notch in each of the other discs, spring means disposed at spaced points along said stop members for normally urging each of said stop members bodily toward said discs, means for guiding the stop member opposite said aligned notches into said notches while retaining the same substantially parallel to the axis of the discs, a typewheel, and a stop arm therefor arranged to engage the selected stop member to determine the printing position of the typewheel.

73. In a telegraph recorder, a distributor, comprising a rotary shaft driven in substantial synchronism with received code combinations of impulses, means controlled by said impulses for arresting said shaft at the end of each character code combination of impulses, and means for correcting said shaft into phase with said impulses between the said periods of rest of the shaft.

74. In a telegraph recorder, a distributor comprising a rotary shaft driven in substantial synchronism with received code combinations of impulses, means for arresting said shaft at the end of each character code combination of impulses for a period equal at least substantially to the time of reception of one impulse, and means for correcting said shaft into phase with said impulses between said periods of rest.

75. In a telegraph recorder, a distributor comprising a rotary shaft driven in substantial synchronism with received code combinations of impulses, means for maintaining said shaft in synchronism with said impulses comprising means for arresting said shaft in a pre-determined angular position thereof and maintaining the same at rest for substantially a full impulse period and means for momentarily arresting the shaft in other angular positions thereof.

76. In a telegraph recorder, a distributor comprising a rotary shaft driven in substantial synchronism with received code combinations of impulses, means for maintaining said shaft in synchronism with said impulses comprising means for arresting said shaft for substantially a full impulse period once each revolution thereof, and means for momentarily arresting the shaft at other times during its revolution.

77. In a telegraph recorder, a distributor comprising a rotary shaft, means for driving said shaft in substantial synchronism with received code combinations of two different line conditions, means acting in a pre-determined angular position of said shaft for stopping the shaft in response to one line condition and restarting it in response to the opposite line condition, and means to correct said shaft into phase relation with the received code combination of line conditions on other reversals of said line conditions.

78. In combination, a source of signals comprising permutations of a definite number of two different line conditions preceded by a starting condition and followed by a rest condition, a distributor comprising a rotary shaft, a second shaft, driving means for said second shaft, means responsive to line signalling conditions for controlling the movement of said second shaft, cooperating means on said shafts acting in response to a rest condition received in a pre-determined position of said first shaft, for stopping the first shaft and acting in response to a starting condition for releasing said first shaft for rotation, said cooperating means acting in other positions of said first shaft to apply a corrective force thereto.

79. In a telegraph recorder, a distributor comprising a rotary shaft driven in substantial synchronism with received code combinations of two different line conditions, a second shaft, driving means therefor, means responsive to line signal conditions for controlling the movement of said second shaft and cooperating means on said shafts acting in pre-determined relative positions of said cooperating means for stopping the first shaft and acting in other pre-determined relative positions thereof for permitting said first shaft to rotate freely.

80. In combination, a source of signals comprising permutations of a definite number of two different line conditions preceded by a starting condition and followed by a rest condition, a distributor comprising a rotary shaft, a correcting element, means responsive to line signalling conditions for controlling the movement of said correcting element, said element acting in a pre-determined position of said shaft in response to a rest condition to stop the shaft and in response to a starting condition to release said shaft for rotation, said correcting element acting in other positions of said shaft to apply a corrective force thereto on each reversal of line signalling conditions.

81. In combination, a source of signals comprising permutations of a definite number of two different line conditions preceded by a starting condition and followed by a rest condition, a plurality of selecting members, a rotary shaft for operating said selecting members in cyclic order, said shaft being normally free to rotate in substantial synchronism with received signalling conditions, a second shaft controlled by received line signal conditions and cooperating means on each of said shafts for stopping said rotary shaft in response to a rest condition and restarting it in response to a starting condition.

82. In combination, a source of signals comprising permutations of a definite number of two different line conditions preceded by a starting condition and followed by a rest condition, a plurality of selecting members, a rotary shaft for operating said selecting members in cyclic order, said shaft being normally free to rotate in substantial synchronism with received signalling conditions, a second shaft, driving means therefor, an escapement mechanism responsive to received line signal conditions for controlling movement of said second shaft and cooperating means on said shafts for stopping the rotary shaft in response to a rest condition and for restarting it in response to a starting condition.

83. In combination, a source of signals comprising permutations of a definite number of two different line conditions preceded by a starting condition and followed by a rest condition, a plurality of selector members, a rotary shaft for operating said selector members in cyclic order, said shafts being normally free to rotate in substantial synchronism with received signals, a second rotary shaft controlled by received line impulses and intermeshing means carried by said shafts, said intermeshing means normally permitting free rotation of said first shaft and acting in response to a rest condition received in a pre-determined position of said first shaft to stop said first shaft and in response to a starting condition to permit restarting of said first shaft.

84. In combination, a source of signals comprising permutations of a definite number of two different line conditions preceded by a starting condition and followed by a rest condition, a plurality of selector members, a rotary shaft for operating said selector members in cyclic order, said shaft being normally free to rotate in substantial synchronism with received signals, a second rotary shaft normally at rest, means for momentarily rotating said second shaft upon each reversal of line signalling conditions, a baffle member carried by said second shaft, a cooperating baffle member carried by said first shaft, said baffle members being arranged to freely pass each other during the rotation of said shafts when the first shaft is in synchronism with the received signals and to engage each other to stop the movement of the first shaft in response to a rest condition.

85. In combination, a source of signals comprising permutations of a definite number of two different line conditions preceded by a starting condition and followed by a rest condition, a plurality of selector members, a rotary shaft for operating said selector members in cyclic order, said shaft being normally free to rotate in substantial synchronism with received signals, a second rotary shaft normally at rest, means for momentarily rotating said second shaft upon each reversal of line signalling conditions, a disc carried by each of said shafts, said discs having cooperating projections and being arranged so that upon rotation of said shafts the projections of one disc move freely between projections of the other disc when said first shaft is in synchronism with the received impulses and so that a projection of one disc engages a projection of the other disc to stop the movement of the first shaft during the reception of a rest condition.

86. In a telegraph receiver responsive to code combinations of marking and spacing line conditions including rest and starting conditions, a distributor shaft, means for rotating said shaft in substantial synchronism with received signal conditions, a correcting member movable into marking and spacing positions in response to marking and spacing line conditions, a plurality of projections on said shaft, at least one of which is of a different shape from the others, said correcting member having openings of different configuration therein and being so arranged that during the movement from one position to the other of said correcting member any one of said projections may be opposed if an out of phase condition exists between said shaft and the received line conditions and in one position of said correcting member all of said projections will be unopposed and in the other position of said correcting member all but said differently shaped projection will be unopposed.

87. In a telegraph receiver responsive to code combinations of marking and spacing line conditions including rest and start conditions, a distributor member, means for rotating said member in substantial synchronism with received signalling conditions, a correcting member movable into marking and spacing positions in response to marking and spacing line conditions, a plurality of projections on one of said members, at least one of said projections being of different shape from the others, said other member having openings of different configuration therein and being so arranged that during movement of the correcting member from one position to the other any one of said projections may be opposed if an out of phase condition exists between said distributor member and said received line conditions and in one position of said correcting member all of said projections will be unopposed and in the other position thereof all but said differently shaped projection will be unopposed.

88. In a telegraph recorder, a selecting cam shaft, a plurality of selector members controlled to operate by said cam shaft, a correcting element for maintaining said shaft in synchronism with received line impulses, means for actuating said correcting element to apply a corrective force to such shaft, if required, upon each change of line signal conditions and means for stopping said shaft for at least substantially a full impulse period once each revolution thereof.

89. In a telegraph receiver, a plurality of selector members, a rotary shaft for controlling the operation of said selector members in cyclic order, said shaft being normally free to rotate in substantial synchronism with received code combinations of selecting conditions, means for momentarily retarding the rotation thereof during reception of selecting conditions whenever said shaft gains in phase relative to the signals and means for stopping said shaft for a substantial period once each revolution thereof.

90. In a synchronous telegraph receiver a rotary receiver, driving means therefor, a magnet responsive to line current impulses, means controlled by said magnet, upon each reversal of line current impulses for applying a corrective impulse to said distributor and means for stopping said distributor for at least substantially a full impulse period once each revolution thereof.

91. In a synchronous telegraph receiver, a rotary distributor, driving means therefor, a magnet responsive to line current impulses and mechanical means controlled by said magnet in response to character selecting impulses for applying a corrective influence to said distributor, said means being responsive to a rest condition accompanying said selecting conditions for arresting said distributor for the duration of said rest condition.

92. In a synchronous telegraph apparatus, a rotary shaft, means for driving said shaft in approximate synchronism with received line current impulses, a magnet responsive to said line current impulses, solely mechanical means controlled by said magnet for applying a plurality of corrections to said shaft during the reception of each character code combination to retain the same in phase with said signal impulses and means responsive to a rest condition accompanying said character code combination for arresting said shaft for the duration of said rest condition.

93. In a selecting mechanism, an electro-magnet, a plurality of selector fingers operated successively in accordance with the energization of said magnet, a plurality of selectors actuated in combinations in accordance with the operation of said selector fingers and means for successively and completely restoring said selector fingers immediately following each operation thereof.

94. In a selecting mechanism, an electromagnet, a plurality of selector fingers each having a single normal position, cam means for operating said selector fingers from said normal position, means for determining the path of movement of said fingers in accordance with the energization of said magnet, a plurality of selectors actuated in combinations in accordance with the operation of said selector fingers and spring means for restoring each of said selector fingers to said normal position immediately following the release thereof by said cam.

95. In a selecting mechanism, an electromagnet, a plurality of selector fingers each having a single normal position, means for operating said selector fingers successively from said normal position, means for determining the path of movement of said fingers in accordance with the energization of said magnet, a plurality of selectors actuated in combinations in accordance with the operation of said selector fingers and means for completely restoring each of said selector fingers to its normal position immediately following the operation thereof.

96. In a single channel telegraph system, a line, means to transmit over said line a series of permutation code signals so that the interval between the last impulse of one signal and the first impulse of the next signal is the same as the interval between succeeding impulses of the same signals, a magnet in said line and a recorder controlled solely by said magnet for recording the characters corresponding to said signals.

97. In a single channel telegraph system, a line, means to transmit over said line a series of permutation code signals comprising a uniform number of two different line conditions for each character code group so that the interval between the last selecting condition of one signal and the first selecting condition of the next signal is the same as the interval between succeeding selecting conditions of the same signal, and a single magnet recorder embodying a series of elements, one corresponding to each selecting condition of the code, and means for positioning each of said elements in one position when the corresponding selecting condition transmitted over the line is of one line condition and for positioning each of said selector elements in another position when the corresponding selecting condition transmitted over the line is of the other line condition.

98. In a single channel telegraph system, a line, means to transmit over said line a series of permutation code signals comprising a uniform number of two different line conditions for each character code group so that the interval between the last selecting condition of one signal and the first selecting condition of the next signal is the same as the interval between succeeding selecting conditions of the same signal and a single magnet recorder directly responsive to said signals in the form in which they are transmitted over said line for recording the characters corresponding to said signals.

99. In a single channel telegraph system, a line, means to transmit over said line a series of permutation code signals comprising a uniform number of two different line conditions for each character code group so that the interval between the last selecting condition of one signal and the first selecting condition of the next signal is the same as the interval between succeeding selecting conditions of the same signal and a recorder comprising a continuously operating rotary shaft, a selector cam shaft driven thereby, a plurality of selectors controlled by said cam shaft and a single magnet responsive to said line signals for selectively determining the operation of said selectors by said shaft.

100. In a telegraph recorder, a group of notched selector discs, a plurality of stop members arranged about the periphery of said discs substantially parallel to the axis thereof, means for operating said discs in combinations according to received code signals to bring certain of said notches into alignment, springs disposed along said stop members at opposite sides of said group of notched selector discs for urging said stop members into aligned notches of said discs and recording means controlled by said stop members.

101. In a telegraph recorder, a group of notched selector discs, a plurality of stop members arranged about the periphery of said discs substantially parallel to the axis thereof, means for operating said discs in combinations according to received code signals to bring certain of said notches into alignment, springs disposed along said stop members symmetrically with respect to said group of notched selector discs for urging the stop members into the aligned notches of said discs and recording means controlled by said stop members.

102. In a telegraph recorder, a group of notched selector discs, a plurality of stop members arranged about the periphery of said discs substantially parallel to the axis thereof, means for operating said discs in combinations according to received code signals to bring certain of said notches into alignment, spring means acting equally on opposite ends of said stop members for urging said stop members into the aligned notches of said discs and recording means controlled by said stop members.

103. In a telegraph recorder, a selecting mechanism, a cyclically operable means for mechanically operating said selecting mechanism, a magnet responsive to line current impulses and means controlled by said magnet upon each reversal of line current impulses for applying a synchronizing force to said cyclically operable means.

104. In a telegraph recorder, a selecting magnet, a selecting mechanism comprising a plurality of primary selectors, corresponding selector actuators each having a normal position, a partially operated position and a completely operated position, a plurality of permutation selectors settable by said selector actuators, a cyclically operable member for operating said primary selectors in succession in accordance with the energization of said magnet, said primary selectors on operation thereof actuating said selector actuators to partially operated position, means for restoring said primary selectors immediately following each operation thereof, means for completing the operation of the partially operated selector actuators to set the selectors corresponding thereto and means for restoring said selector actuators to normal position.

105. In a telegraph recorder, a selecting magnet, a selecting mechanism comprising a plurality of primary selectors, corresponding selector actuators each having a normal position, a partially operated position and a completely operated position, a plurality of permutation selectors settable by said selector actuators, a cyclically operable member cooperating with said magnet to control the selective operation of said primary selectors in succession, said primary selectors on operation thereof controlling the operation of said selector actuators to partially operated position, means for restoring said primary selectors immediately following each operation thereof, means for completing the operation of the partially operated selector actuators to set the selectors corresponding thereto and means for restoring said selector actuators to normal position.

106. In a telegraph recorder, a selecting magnet, a selecting mechanism comprising a plurality of primary selectors, corresponding pivoted selector actuators each having a normal position, a partially operated position and a completely operated position, a plurality of permutation selectors settable by said selector actuators, a cyclically operable member cooperating with said magnet to control the selective actuation of said primary selectors in succession, means whereby said primary selectors on operation thereof control the operation of said selector actuators to partially operated position, means for completing the operation of the partially operated selector actuators to set said selectors and means for restoring said selector actuators to normal position.

107. In a telegraph recorder, a selecting magnet, a selecting mechanism comprising a plurality of primary selectors, corresponding pivoted selector actuators each having a normal latched position, a partially operated latched position and a completely operated position, a plurality of permutation selectors settable by said selector actuators, a cyclically operable member cooperating with said magnet to control the selective actuation of said primary selectors in succession, means whereby said primary selectors on operation thereof control the operation of said selector actuators to partially operated position, means for completing the operation of the partially operated selector actuators to set said selectors and means for restoring said selector actuators to normal position.

108. Telegraph receiving apparatus comprising a series of elements having two pivot points, means operative to actuate said elements in successive order about one or the other of said pivot points and signal controlled power operated means to selectively determine the pivot point about which said elements are actuated by said first means.

109. In a telegraph printer, a selector magnet responsive to permutations of a definite number of two different line conditions, a plurality of selecting elements, a movable abutment common to said selector elements, a friction driven rotary member for moving said selecting elements relative to said abutment, in succession, in phase with said line conditions, means controlled by said magnet in response to said line conditions for moving said abutment either into or out of the path of movement of said selectors to selectively actuate said selectors, secondary selectors comprising pivoted bell crank levers engaged by said selecting elements during the selecting movement thereof, as each impulse is received, latch means for holding said secondary selectors in selected position, a type wheel, a type wheel stop assembly having a plurality of plates, clutch driven power means for moving said plates, said secondary selectors controlling in succession the movement of said plates by said motor driven means, at least a portion of said plates being moved in the same cycle in which the selective signals are received, said type wheel being released for movement simultaneously with the movement of the first plate and means controlled by the combined movement of all of said plates for bringing said type wheel to rest in a selected angular position.

110. In a telegraph printer, a selector magnet response to permutations of a definite number of two different line conditions, a plurality of selecting elements, a movable abutment common to said selector elements, means for moving said selecting elements relative to said abutment, in succession, in phase with said line conditions, means controlled by said magnet in response to said line conditions for moving said abutment either into or out of the path of movement of said selectors to selectively actuate said selectors, secondary selectors actuated by said selecting elements during the selecting movement thereof, as each impulse is received, a typewheel, a type wheel stop assembly, said secondary selectors controlling said stop assembly for bringing said type wheel to rest in a selected angular position.

111. In a telegraph printer, a selector magnet responsive to permutations of a definite number of two different line conditions, a plurality of selecting elements, a movable abutment, power operated means for moving said selecting elements relative to said abutment, in succession, in phase with said line conditions, means controlled by said magnet in response to said line conditions for moving said abutment either into or out of the path of movement of said selectors to cause selective actuation of said selectors by said power operated means, secondary selectors comprising pivoted bell crank levers engaged by said selecting elements during the selecting movement thereof, as each impulse is received, a type wheel, a type wheel stop assembly, said secondary selectors controlling said stop assembly for bringing said type wheel to rest in a selected angular position.

112. In a telegraph printer, a selector magnet responsive to permutations of a definite number of two different line conditions, a plurality of selecting elements, a movable abutment, power operated means for moving said selecting elements relative to said abutment, in succession, in phase with said line conditions, means controlled by said magnet in response to said line conditions for moving said abutment either into or out of the path of movement of said selectors to selectively actuate said selectors, a type wheel, a type wheel stop assembly having a plurality of plates, means for moving said plates, said selectors controlling in succession the movement of said plates by said last means, at least a portion of said plates being moved in the same cycle in which the selective signals are received and means controlled by the movement of said plates for bringing said typewheel to rest in a selected angular position.

113. In a telegraph printer, a selector magnet responsive to permutations of a definite number of two different line conditions, a plurality of selecting elements, means controlled by said magnet in response to said line conditions to selectively actuate said selectors, secondary selectors engaged by said selecting elements during the selecting movement thereof, as each impulse is received, a type wheel, a type wheel stop assembly having a plurality of plates, means for moving said plates, said secondary selectors controlling in succession the movement of said plates by said last means, at least a portion of said plates being moved in the same cycle in which the selective signals are received, and means controlled by the movement of said plates for bringing said typewheel to rest in a selected angular position.

114. In a telegraph printer, a plurality of selector elements having a normal and a selected position, means for selectively positioning said elements in response to and in accordance with received code combinations of impulses, a typewheel positioning mechanism, means for moving only selected ones of said elements to selectively operate said typewheel positioning mechanism and means operative thereafter for restoring said selected elements to their normal position.

115. In a telegraph receiver, a plurality of selectors having normal and selected positions, means for positioning said selectors in selected position in accordance with the received line signaling conditions, a plurality of code members having normal and operated positions, an operating cam member cooperating with said selectors and code members, said cam member having a cam face for gathering said code members together in normal position, a cam face for transferring the setting of said selectors to said code members and a cam face for restoring said selectors to normal position, said cam faces acting to perform their functions in the order named.

116. In a selecting mechanism, a plurality of selecting members each having a normal and a selected position, means responsive to received combinations of impulses for positioning predetermined of said selecting members to their selected position in accordance with said impulses, a typewheel stop mechanism, means to further actuate said selectively positioned selecting members to control said typewheel stop mechanism and means for restoring said selectively positioned selecting members to their normal position.

VERNON R. KIMBALL.
ROBERT F. DIRKES.
EVAN R. WHEELER.